(12) United States Patent
Williames

(10) Patent No.: US 6,773,368 B1
(45) Date of Patent: Aug. 10, 2004

(54) VARIABLE SPEED VEHICLE POWERTRAINS

(76) Inventor: Geoffrey Allan Williames, Butlers Track, Warragul, Victoria 3820 (AU)

( * ) Notice: Subject to any disclaimer, the term of this patent is extended or adjusted under 35 U.S.C. 154(b) by 0 days.

(21) Appl. No.: 09/701,152

(22) PCT Filed: May 27, 1999

(86) PCT No.: PCT/AU99/00411

§ 371 (c)(1),
(2), (4) Date: Jan. 4, 2001

(87) PCT Pub. No.: WO99/61820

PCT Pub. Date: Dec. 2, 1999

(30) Foreign Application Priority Data

May 27, 1998 (AU) .......................................... PP3737/98

(51) Int. Cl.[7] .............................................. F16H 47/04
(52) U.S. Cl. .............................. 475/74; 475/78; 475/80
(58) Field of Search ............................. 475/74, 78, 80, 475/83

(56) References Cited

U.S. PATENT DOCUMENTS

| 3,132,534 A | * | 5/1964 | Boehner ...................... 475/206 |
| 3,196,696 A | * | 7/1965 | Ritter ........................... 475/83 |
| 3,204,486 A | * | 9/1965 | Lalio ........................... 475/208 |
| RE27,307 E | * | 3/1972 | Lalio ........................... 475/74 |
| 3,698,189 A | | 10/1972 | Reimer |
| 3,897,697 A | * | 8/1975 | Chambers et al. ............. 475/80 |
| 3,915,030 A | * | 10/1975 | Ritter ........................... 475/198 |
| 5,193,416 A | | 3/1993 | Kanayama |
| 5,421,790 A | * | 6/1995 | Lasoen ......................... 475/78 |

FOREIGN PATENT DOCUMENTS

| FR | 532471 A | 2/1922 |
| GB | 1161508 A | 8/1969 |

* cited by examiner

Primary Examiner—Charles A. Marmor
Assistant Examiner—Ha Ho
(74) Attorney, Agent, or Firm—Welsh & Katz, Ltd.

(57) ABSTRACT

A power dividing device for a vehicle transmission to provide two rotating outputs having variable relative speed of rotation from a single rotatable input. The device includes a first rotational element and a second rotational element housed within the first element and rotatable about the same axis as the second rotational output. A first fluid chamber associated with the first rotational element and first regulating means to varies the volume of the first chamber in response to rotation of the first rotational element. A second fluid chamber associated with the second rotational element and second regulating means likewise varies the volume to the flow between the first and second chambers the relative timing of variation of the volumes of the first and second chambers determines the speed of the second rotational element in response to rotation of the first rotational element.

23 Claims, 27 Drawing Sheets

VARIABLE SPEED VEHICLE POWERTRAINS

FIELD OF INVENTION

This invention relates to vehicle powertrains.

BACKGROUND ART

Vehicle powertrains generally are comprised of a power source connected via a clutch mechanism to a geared transmission controlled manually or by a series of clutches and brakes both of which provide generally three or more distinct drive ratios. Most vehicles still use an internal combustion engine as a power source. Internal combustion engines generally have a narrow band of operating revolutions per minute (r.p.m.) matched to the torque or driving force as a "sweet spot" giving maximum fuel is efficiency and minimum pollution.

The effect of the stepped transmission is that in each of the gears or steps the engine is at first subject to high torque demand at low revolutions causing lugging where the piston is moving slower than the flame front in the combustion stroke. As the engine r.p.m. increases, it passes through the sweet spot of balanced operation of r.p.m. and torque with the piston moving at the speed of the flame front and expanding air. The engine r.p.m. then exceeds the balance of r.p.m. and torque requirement and enters an over-speed situation until the next gear is engaged and the foregoing is again repeated through the next and subsequent gear shifts.

On the open highway, more efficiency is obtained by having an overdrive gear that once again more closely balances the engine r.p.m. and torque requirement. This is usually a fixed gear ratio and generally near the maximum capacity of the engine for operating on flat or moderately undulating terrain. When an incline is encountered most automatic transmissions require the driver to operate a manual button or automatically kick down to a lower geared ratio in a relatively large step with resultant inefficiencies. If the load encountered is in the mid top gear/overdrive range, the transmission will often repeatedly change up and down at regular relatively rapid cycles with a resultant acceleration and deceleration obvious to both driver and passengers.

In an attempt to run the engine constantly and consistently in the sweet spot of balanced engine r.p.m. with the required torque and piston speed being balanced with the combustion cycle flame front and expanding gases, prior art shows attempts at combining various gear drive systems requiring a variable speed input. Generally friction drive coned pulleys or rollers are used achieving speed variation by sliding the tapered cones relative to each other. The amount of torque being able to be transferred by this means is minimal and the resultant wear has made this option unworkable Vee pulleys and matching expandable V pulleys using a wide "V" belt have had limited success in the low horsepower area.

Variable speed transmissions using hydraulic pumps and motors in prior art are designed so that as the r.p.m. of the output increases the quantity of oil flow also increases causing additional friction loss due to increased flow. In an attempt to minimise this loss, higher pressures and lower flows have been used. This causes very poor low speed torque characteristics The resultant loss of efficiency and performance, with energy loss, heat generation and the need for cooling dissipation through additional circuits and coolers has meant that this form of transmission has not been viable for high speed vehicular application and has only been applied to low speed tractors and mobile machines.

The present applicant's International Patent Application PCT/AU97/00714 discloses a vehicle power transmission and power train capable of being continuously controlled over a predetermined range of operation by means of an outer transmission and an inner differential gear assembly controlled by two rotatable inputs. The inputs from a microprocessor continually monitor all vital inputs and outputs and making continuous real time micro-adjustments to ensure ease and smoothness for driver and passengers, fuel efficiency and pollution reduction. Although a single power source can be used to drive the two inputs, for example through hydraulic drive systems, the International application primarily describes the use of a split engine or two power sources, one power unit continuously running in the sweet spot for maximum fuel and pollution efficiencies, the second power source being used to balance the variable input forces. The disclosure of International Application PCT/AU97/00714 is incorporated herein by cross reference and are hereinafter referred to as "the applicant's previous application"

DISCLOSURE OF THE INVENTION

For volume automotive manufacture and to minimise capital tooling costs, it is advantageous to use existing high volume engine manufacture. It is also desirable to gain the advantage of continuously running an entire singular power source at maximum balanced r.p.m. and torque, constantly in the sweet spot for maximum fuel efficiency and minimal pollution, and to maintain that operation precisely in all spectrums of vehicle driving range.

It is an object of one aspect of this invention to provide a power dividing device to provide two rotating outputs having variable relative speed of rotation from as single rotatable input. It is an object of another aspect of the present invention to provide a vehicle powertrain and a power transmission capable of being continuously controlled over a predetermined range of operation.

In a first aspect this invention provides a power dividing device to provide two rotating outputs having variable relative speed of rotation from a single rotatable input, said device including a first rotational element driven in rotation about a rotational axis and having a first rotational output; a second rotational element rotatable about said rotational axis and having a second rotational output: a first fluid chamber associated with said first rotational element; first regulating means to vary the volume of said first chamber in response to rotation of said first rotational element: a second fluid chamber associated with said second rotational element second regulating means to vary the volume of said second chamber in response to rotation of said second rotational element; commutator means to at least regularly establish a closed fluid flow communication between said first and second chambers during rotation of said first and second rotational elements; the relative timing of variation of the volumes of said first and second chambers determining the speed of rotation of said second rotational element in response to rotation of said first rotational element.

In another aspect this invention provides a power transmission unit including a power dividing device, an outer main transmission and an inner differential gear assembly;

the power dividing device providing two rotating outputs having variable relative speed of rotation, said device including a first rotational element driven in rotation about a rotational axis by a power unit and having a first rotational output; a second rotational element rotatable about said rotational axis and having a second rotational output; a first fluid chamber associated with said first rotational element; first regulating means to vary the volume of said first chamber in response to rotation of said first rotational element: a second fluid chamber associated with said second rotational element; second regulating means to vary the volume of said second chamber in response to rotation of said second rotational element; commutator means to at least regularly establish a closed fluid flow communication between said first and second chambers during rotation of said first and second rotational elements; the relative timing of variation of the volumes of said first and second chambers determining the speed of rotation of said second rotational element in response to rotation of said first rotational element;

the main transmission having two rotatable input means each respectively driven by the first rotational output and the second rotatable output of said power dividing device, the two input means being operably connected to rotatable output means so that the rotational speed of the output means can vary in proportion to the algebraic mean of the speeds of rotation of the two input means;

the differential gear assembly being arranged internally of the main transmission and having rotatable input means operably connected to two differentially rotatable output means, wherein the output means of the main transmission and the input means of the differential gear assembly are operably connected.

In another aspect this invention provides a vehicle powertrain capable of being continuously controlled over a predetermined range of operation including:

a single power unit;

a power transmission unit including a power dividing device, an outer main transmission and an inner differential gear assembly;

the power dividing device providing two rotating outputs having variable relative speed of rotation, said device including a first rotational element driven in rotation about a rotational axis by said power unit and having a first rotational output; a second rotational element rotatable about said rotational axis and having a second rotational output; a first fluid chamber associated with said first rotational element; first regulating means to vary the volume of said first chamber in response to rotation of said first rotational element; a second fluid chamber associated with said second rotational element; second regulating means to vary the volume of said second chamber in response to rotation of said second rotational element; commutator means to at least regularly establish a closed fluid flow communication between said first and second chambers during rotation of said first and second rotational elements; the relative timing of variation of the volumes of said first and second chambers determining the speed of rotation of said second rotational element in response to rotation of said first rotational element;

the main transmission having two rotatable input means each respectively driven by the first rotational output and the second rotatable output of said power dividing device, the two input means being operably connected to rotatable output means so that the rotational speed of the output means can vary in proportion to the algebraic mean of the speeds of rotation of the two input means;

the differential gear assembly being arranged internally of the main transmission and having rotatable input means operably connected to two differentially rotatable output means, wherein the output means of the main transmission and the input means of the differential gear assembly are operably connected.

In accordance with the invention a single power unit supplies one drive line of the transmission at a constant speed to the power source r.p.m. and a second drive line from the same power unit which by means of captive volumes or rods of fluid, preferably oil, allows the reactive forces of the transmission to react directly against the power source without loss of energy in balancing the forces.

Preferably, the second drive line mechanically varies the quantities of entrapped oil to allow the variation of the speed of the two input to the transmission causing the rotational speed of the output to vary in accordance with the formula $$V_{out} = 2 \times V_{secondary} - V_{primary}$$

where Vout is the output speed, Vsecondary is the speed of the secondary input provided by the second rotational output of the power divider and Vprimary is the speed of the primary input provided by the first rotational output of the power divider, In accordance with the invention the power divider uses a unique method of proportionate control of entrapped oil so that the second rotational output preferably always:

Rotates in the same direction as the first rotational output;

Never rotates less than one third of the speed of the first rotational output when the transmission output is in reverse except when used in machines requiring equal speed in forward and reverse in which case the second rotational output can be reduced to zero rpm;

Runs at half of the speed of the first rotational output when in neutral dynamic lock;

Runs at the same speed as the first rotational output when in full forward motion.

The differential gear assembly is arranged internally of the main transmission and has rotatable input means operably connected to two differential rotatable output means, wherein the output means of the main transmission and the input means of the differential gear assembly are operably connected.

Control means are provided and include means for receiving command input and means for determining performance parameters associated with the operation of the powertrain. The performance parameters include the load on the power unit the pressure of the encapsulated rods of oil in the secondary drive line restraining the outer transmission forces, the rotational speeds of the first primary drive line and the secondary drive line of the main transmission, the load on each of the two output means of the differential gear assembly, and the rotational speeds of each of the two output means of the differential gear assembly.

The control means provides closed loop feedback control to continuously monitor, analyse and adjust the performance parameters in response to command input.

The power unit can be comprised of any range of conventional internal combustion engine type—including the Otto engine, the diesel engine, a rotary engine including true balanced rotary engine with compression and expansion cycle or a gas turbine engine as well as conventional electric motor types. The Otto and diesel internal combustion engines are preferred because they represent established mass produced technologies with relatively low production costs.

Preferably, the rotational power output means of the primary and secondary drive lines rotate in the same direction with respect to the power transmission unit.

Preferably at least one of the rotational power output means of the two power drive lines is selectively operably connected to input means of the main transmission of the power transmission unit by clutch means Alternatively the microprocessor sensing at rest zero inputs will output commands to so position the control mechanism for the encapsulated rods of oil to determine the secondary drive line rotational speed to be half that of the primary drive input into the transmission thus 2:1 input ratio will produce a zero output rotation with dynamic lock in zero output position.

The operable connection may also include gear, chain, belt, electric hydraulic or direct engine drive shaft connection means.

The power units, primary and secondary drive, outer transmission and internal differential may conveniently be surrounded by a common housing or be conveniently detachable as an assembly from the power unit.

The powertrain of this invention permits the power unit configuration to be optimised for different applications. For example a constant speed electric motor with provision to be used as a generator for regenerative braking and deceleration. A power unit of any type running at constant maximum efficiency either directly or via a high-speed flywheel encased in a vacuum running on low friction or magnetic bearings used to supply highly variable power demands and regenerative braking such as city driving to provide an extremely low pollution hybrid.

The main transmission of the power transmission unit advantageously comprises a gear train. Preferably, the two inputs means of the main transmission comprises a first bevel gear and an epicyclic gear assembly coaxially arranged to rotate about a first axis. Advantageously, the epicyclic gear assembly comprises an annular pinion carrier that rotatably supports internally arranged epicyclic bevel pinion, gears having axes perpendicular to the first axis. Conveniently, the first bevel gear and the annular pinion carrier are each individually operably connectable to rotational power sources, such as the primary and secondary drive lines from a singular power source or a combination hybrid power source with a singular output shaft providing power to the transmission unit via both the primary and secondary drive lines. Preferably, the output means of the main transmission comprises a second bevel gear arranged coaxially with both the first bevel gear and the epicyclic gear assembly to rotate about the first axis. Advantageously, the epicyclic gear assembly is arranged between the first and second bevel gears with the epicyclic bevel pinion gears in mesh with both the first and second bevel gears. The main transmission, as described, comprises a continuously variable transmission wherein the speed of the output means varies according to the speeds of the input means in accordance to the following formula:

$$V_{out} = 2 \times V_{secondary} - V_{primary},$$

where Vout is the output speed, Vsecondary is the speed ofthe secondary input (the epicyclic gear assembly) and Vprimary is the speed of the primary input.

Preferably, the input means of the differential gear assembly of the power transmission. unit comprises differential bevel pinion gears arranged radially inside the main transmission to rotate about axes perpendicular to the first axis. Advantageously the output means of the differential gear assembly comprises two differential bevel side gears coaxially arranged in mesh with the differential pinion gears to rotate about the first axis.

Preferably, the first and second bevel gears of the main trarismission each have a centrally formed and axially extending hole, Preferably, the two differential side gears of the differential gear assembly are centrally mounted on opposed ends of two coaxially aligned power output members such as half axles, that extend axially outwards through the holes in the first and second bevel gears of the main transmission and are advantageously operably connectable to drive wheels.

Advantageously, the main transmission is operably connected to the differential gear assembly by a differential frame that is connected to the second bevel gear of the main transmission and which carries the differential pinion gears of the differential gear assembly, The differential gear assembly, as described, has the functionality of a conventional automotive differential gear. This configuration is particularly advantageous for use with primary and secondary power unit and/or drive lines such as hollow shafted "pancake" type true rotary engines or turbines or hollow shafted primary and secondary drive lines comprised of gears, sprockets or axial and radial so piston, hydraulic restraining and power supply means to control the reactive energy between the common power unit and the primary and secondary drive line from the singular or hybrid power supply source, The drive lines can be conveniently arranged on either side of the transmission with the outputs exiting through the respective primary and secondary drive lines to provide an extremely simple, compact and lightweight power train.

Where the powers unit comprises Otto engines or diesel engines, the power transmission unit is conveniently located centrally, beneath or on the same side of the power unit and the primary and secondary drive line which input via hollow gears, sprockets or radial or axial hydraulics with hollow centres as described.

In the case of trans axle front wheel drive application the power transmission unit is conveniently located in relation to the power unit and drive lines to locate between the front wheel assemblies so as to conform with the required lo cation and space to suit current mass produced vehicles.

In the case of a four wheel drive car, tractor or truck, the power transmission unit is conveniently located in relation to the in-line power unit and drive lines positioned to locate the power transmission with the outputs through the respective primary and secondary drive lines and through the axially extending hole of the first and second bevel gears of the main transmission, thus allowing aligned power output members such as half axles to extend forward and aft of the differential gear assembly which in turn provides rotational power by way of universals and torque tubes forward and aft to the front and rear differentials and axles to all four wheels.

In the case of a two wheel drive tractor or a rear wheel drive truck, the power unit can remain longitudinally positioned in the normal traditional manner and the primary and secondary drive lines supply power directly to the power transmission located in the normal position of the standard differential. By this means heavy-duty high torque trucks and tractors which, normally require 10 and 12 speed gearboxes to optimise engine r.p.m. and torque under heavy load and torque demands across a wide spectrum of operating conditions can have the gearbox eliminated by simply adding an additional crown wheel and pinion to the standard crown wheel and pinion, with the provision of the pinions being able to freely rotate within an annular support of the outer transmission members. This provides a stepless speed range from reverse through to overdrive by means of simply varying the ratio between the primary and secondary drive line.

Where the power unit comprises rotary, true rotary, gas turbine or electric engine, the power transmission unit may conveniently be mounted centrally between the power unit on one side as the primary drive line transmission input and the secondary drive line as described on the opposite side, with the power output members extending through the centre of hollow rotor or turbine shafts and through the hollow secondary drive system an the opposite side of the transmission unit. Further, the housing of the power transmission unit may be integral with the common casing of the power units and secondary drive line.

Advantageously, an internal combustion engine can supply a primary direct drive line and a secondary variable speed drive line from a common shaft that constitutes two variable speed drive lines.

The advantage of this arrangement is that a standard high volume mass produced engine can be used as the singular power source or in some applications a flywheel arrangement can be provided as a means of storing kinetic energy. The flywheel may or may not be associated with the power unit. The flywheel arrangement can be used to supplement power input in times of peak demand and/or provide for regenerative braking. The flywheel may be used as directly driven by the singular power source or by regenerative braking by a fixed gearing and overrun sprag clutch between the engine and flywheel, with the flywheel then providing power via a common output shaft to the primary and secondary drive lines. Alternatively the flywheel can be positioned as a highspeed geared position in the primary or secondary drive line with suitable gearing down to the transmission unit primary or secondary drive input.

The power transmission unit descried above conveniently integrally combines the functionality of the main transmission and the differential gear assembly such that input rotational power may be differentially transmitted to two rotational power outputs at continuously variable output speeds while the singular power source runs at a speed and torque giving maximum fuel, efficiency, minimum pollution and smooth vehicle performance.

The control means advantageously comprises a microprocessing control unit having an input device for receiving command input, for example from a vehicle driver, and a plurality of input/output interface devices for providing closed loop feedback control of the performance parameters of the vehicle powertrain. The plurality of input/output interface devices advantageously comprising a plurality of high performance sensors for monitoring, analysing and transmitting data on the performance parameters of the power train. Preferably, the performance parameters continuously controlled by the microprocessing control unit further include performance parameters that are specific to the type of power unit including the variable secondary drive line oil pressures and interactive forces and controls comprising the vehicle power train. For example, where the power unit is comprised of one internal combustion piston engine, the performance parameters continuously controlled by the microprocessing control unit may further include performance parameters that are specific to most efficient fuel burn and least pollution such as manifold pressure and/or boost pressure, engine torque, engine r.p.m., fuel air mixture, fuel flow, sprocket timing, valve timing, variable intake manifold geometry, variable compression, variable precombustion chamber compression in the case of indirect fired diesel engine, combustion chamber conditions, compression ratio and exhaust gas chemistry and temperature.

In use, the microprocessing control unit advantageously provides self-diagnostic closed loop feedback control to continuously monitor, analyse and synergistically adjust the performance parameters in response to command inputs from the driver. Specifically, the microprocessing control unit advantageously adaptively responds to command input and/or analysis of data on the performance parameters and continuously controls speed and torque of the power units and the other power unit variables to maintain fuel burn efficiency and minimal pollutant while continuously controlling the final output speed and power of the powertrain to meet operational requirements by synergistically adjusting the performance parameters, including the relative speeds of the power input means and primary drive line and the secondary variable drive line hydraulic pressures and speed and the reactive load sharing between the transmission and the two drive lines and power unit.

Advantageously, the microprocessing control unit is programmable with a performance algorithm so that it continually adjusts the controlled performance parameters in accordance with the algorithm to optimise powertrain performance. For example, the microprocessing control unit may be programmed to optimise powertrain efficiency. In which case in response to command input from the vehicle driver the microprocessing control unit would continuously monitor, analyse and synergistically adjust the performance parameters of each of the two power drive lines from a singular power unit to maintain the efficiency of the power Unit within peak ranges which simultaneously continually monitoring and adjusting the load sharing between the power unit and primary drive line and the hydraulic pressure and allowance of reduction of drive speed of the secondary drive line to reduce in accordance with the reactive load transferred from the transmission by varying the length of entrapped rods of oil to synergistically control the final output speed and power of the transmission to meet operational requirements. As such, overall power unit efficiencies will be achieved over a wide range of different operating conditions.

It will be appreciated that where the power unit is an internal combustion engine type significant improvements in fuel economy and correspondingly significant reductions in exhaust gas emissions will be achieved. It will be further appreciated that in order to optimise the overall power unit efficiencies, the power unit may encompass a rotary engine, true balanced rotary engine with compression and expansion cycle, gas turbine engine, diesel engine, Otto engine, electric motor or a hybrid combination of power unit and energy storage and regenerative braking system, This could, for example, take the form of an internal combustion engine and electrical generator with high energy low weight efficient battery storage and electric motor power unit or an internal combustion engine with combined flywheel regenerative braking power unit internal combustion engine with a generator and combined electric motor/generator flywheel for energy storage and regenerative braking as a power unit. As a further example an advantageous use of the invention with a combination of hybrid power unit technologies can be used such as a fuel cell which converts methanol into hydrogen, the hydrogen can be fed through a proton exchange membrane fuel cell where it is combined with atmospheric oxygen to provide power for an electric motor which in turn powers an electric motor/generator flywheel for stored energy and regenerative braking. This power unit can supply power to the advanced transmission as described providing the means to have a real time interactive precise control of power usage and regeneration for optimum efficiency in which pollution would be eliminated with only the emission of water vapour. Alternatively a fuel cell and regenerative braking could supply energy to efficient energy storage batteries providing electrical power to an electric motor connected either directly or via an energy storage flywheel to the advanced transmission as described. The transmission microprocessor control would instantaneously adjust the external highly variable load demands to an optimum input power draw suited to the power unit to prevent system overload but to give optimum power output performance.

In another advantageous use of the entrapped oil coming under pressure due to the reactive force of the transmission on the secondary drive line, energy storage and regenerative braking energy may be stored by the oil compressing nitrogen in a nitrogen-charged accumulator that will provide energy on short peak demands such as stop/start situations in city driving.

In an internal combustion engine, the ignited fuel air mixture burns in a flame front continuing out to the perimeter of the confines of the cylinder. The expanding gases that are generated push the piston away from the cylinder head, thereby rotating the crankshaft and providing a power stroke. As the piston moves away from the expanding gases, it increases the cylinder volume. The higher the initial cylinder compression ratio the faster the burn rate and corresponding expansion rate and the need for faster piston speed which equates to higher engine r.p.m. With a fixed compression engine, it is desirable to have the piston speed match the rate at which the gases are expanding for optimum cylinder pressure, resulting in best fuel efficiency and lowest pollution levels. It is the intention of preferred embodiments of this invention to utilise the control of variable rods of oil to allow a variation of the proportion of the transmission reactive forces to vary the ratio between the primary and secondary drive from a common power source. By so doing the reactive forces are cancelled out by the initial drive being from a common drive shaft and the primary and secondary drive, line speed variation applied to the outer transmission continuously adjust to allow the input power source to remain at the optimum balance of r.p.m. and torque for maximum efficiency to meet the variable load demands and to coincide with energy levels required to maintain the desired vehicle speed. By having the function of a stepless variable speed constant mesh transmission as described giving the precise vehicle speed required while maintaining the optimum fuel air burn rate, by varying the engine's r.p.m. and by varying the compression ratios and fuel air ratios, optimum operating conditions can be maintained in real time across the full spectrum of vehicle speed and energy requirements, giving minimum pollution and maximum fuel efficiency. A further control of the speed of the flame front, particularly related to a diesel engine, is to have a variable displacement pre-combustion chamber and/or the main combustion chamber. The interaction of inputs and outputs from the microprocessing unit allows optimum settings of engine speed, combustion chamber compression ratio and/or pre-combustion chamber displacement, to give smooth even fuel air burn speed (flame front), corresponding with the mechanical movement and speed of the restraining members in a piston or rotary engine.

Embodiments of the invention will now be described, by way of example only, with reference to the accompanying drawings.

BEST MODES OF CARRYING OUT THE INVENTION

The principle of operation of the transmission forming part of the invention will first be described with reference to FIGS. 4 to 9.

DIFFERENTIAL RATIOS AND REACTIVE FORCES

3:1 Ratio of Inputs

Figure 4:
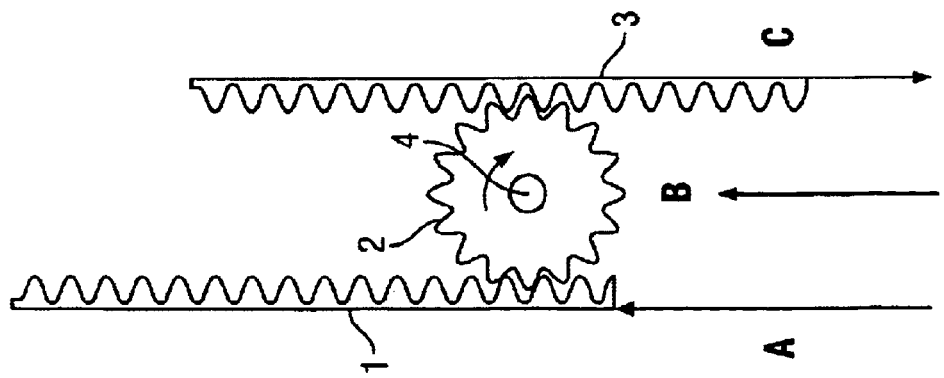

By way of illustration it can be seen in FIG. 4 that if rack 1 is moved forward in the direction of the arrow A by 30 teeth and if the spindle 4 of gear 2 is moved forward in the direction of arrow B for a distance equal to 10 teeth on rack 1 being equal to a power input ratio of 3.1, then the gear 2 will be caused to rotate clockwise by twenty teeth causing the gear rack 3 to move in the direction of the arrow C by 20 teeth. However as the gear 2 has moved forward in the direction of arrow B by the distance of 10 teeth, the rack 3 will, move in the direction of arrow C by the distance of 10 teeth. The net effect is that with a primary drive moving rack 1 forward and a secondary drive moving the pivot 4 of gear 2 forward at one third of the speed of the primary drive rack 1 at a 3:1 ratio. The rack 3 will move in reverse direction at one third of the input speed of the primary drive rack 1.

The reactive forces associated with 3:1 ratio are that rack 1 requires force in the direction of arrow A and the spindle 4 of gear 2 must be restrained with a force in the reverse direction of arrow B to cause gear 4 to rotate about the axis 2 and to cause force to be applied to rack 3 which then provides force in the direction of arrow C. It can be seen that with both rack 1 and gear spindle 4 moving in the same direction at a 3:1 ratio that rack 3 will do useful work in the reverse direction but only while gear spindle 4 is restrained in the reverse direction to arrow B and in the same direction as the work performed in reverse in the direction of arrow C.

2:1 Ratio of Inputs

Figure 5:
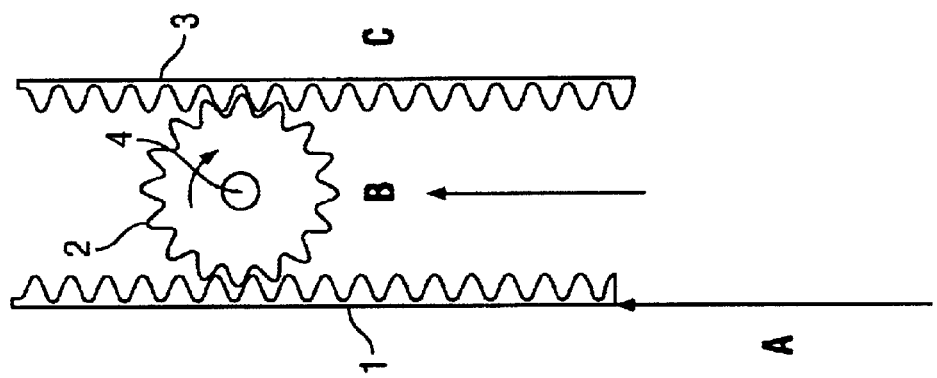

In FIG. 5 if the rack 1 is moved forward by the distance of 30 teeth in the direction of arrow A and if the gear spindle 4 is moved forward by a distance equivalent of 15 teeth of rack 1 in the direction of arrow B this will give a ratio of 2:1 between the primary and secondary power inputs. It will be seen that if gear spindle 4 has travelled only half the distance of rack. 1, then gear 2 will have rotated clockwise 15 teeth about spindle 4, but as the gear spindle 4 has moved forward by the distance equivalent to 15 teeth, then rack 3 will remain stationary at C. It can be seen that with the primary drive rack 1 and secondary drive line gear spindle 4 both moving in the same direction at a 2:1 ratio results in gear rack 3 remaining stationary in a dynamic neutral lock position.

The reactive forces with a ratio of 2:1 between the primary power drive line rack 1 and secondary power drive line to gear spindle 4 is that there are no reactive forces required other than overcoming friction provided there is no load applied in either direction to output rack 3 which is stationary at C.

If a load is applied to rack 3 in the direction of arrow B then a reactive effort will be required equal in force on the gear spindle B in the reverse direction to B to balance the force applied to C plus the load applied to rack 1 in the direction of arrow A will be required to be equal to the reverse rotational force acting on gear 2 around the spindle 4 being transferred from and equal to the force acting on rack 3 at C. The net effect is that the force required on gear rack 1 in the direction of arrow A will need to be equal and will be transferred via gear 2 pivoting around spindle 4 to gear rack 3 to equal the force applied to gear rack 3 in the direction of arrow B thus the spindle 4 will be subject to the sum of both the force applied to rack 1 and rack 3 and need to be restrained in the opposite direction to arrow B. That is spindle B will require double the restraining force to that applied as a load to the output rack 3 at C.

If a reverse load is applied to power output gear rack 3 at C in the opposite direction of arrow B then spindle 4 will require double the force in the direction of arrow B and rack 1 will experience the reactive force in the opposite direction to arrow A.

It can be seen that in a 2:1 ratio of the primary and secondary power drive lines rack 3 will remain stationary but depending on the direction of load applied to gear rack 3 that even though both the primary and secondary drive lines are rotating in the same direction, the reactive energy of the applied load to output rack 3 if reversed will cause an immediate reactive load in the opposite direction to the primary drive line rack 1 and secondary drive line gear spindle 4 so that the forward driving off restraining loads will reverse, alternating with each change of direction of load on the power output rack 3 at C.

1:1 Ratio of Inputs

Figure 1:
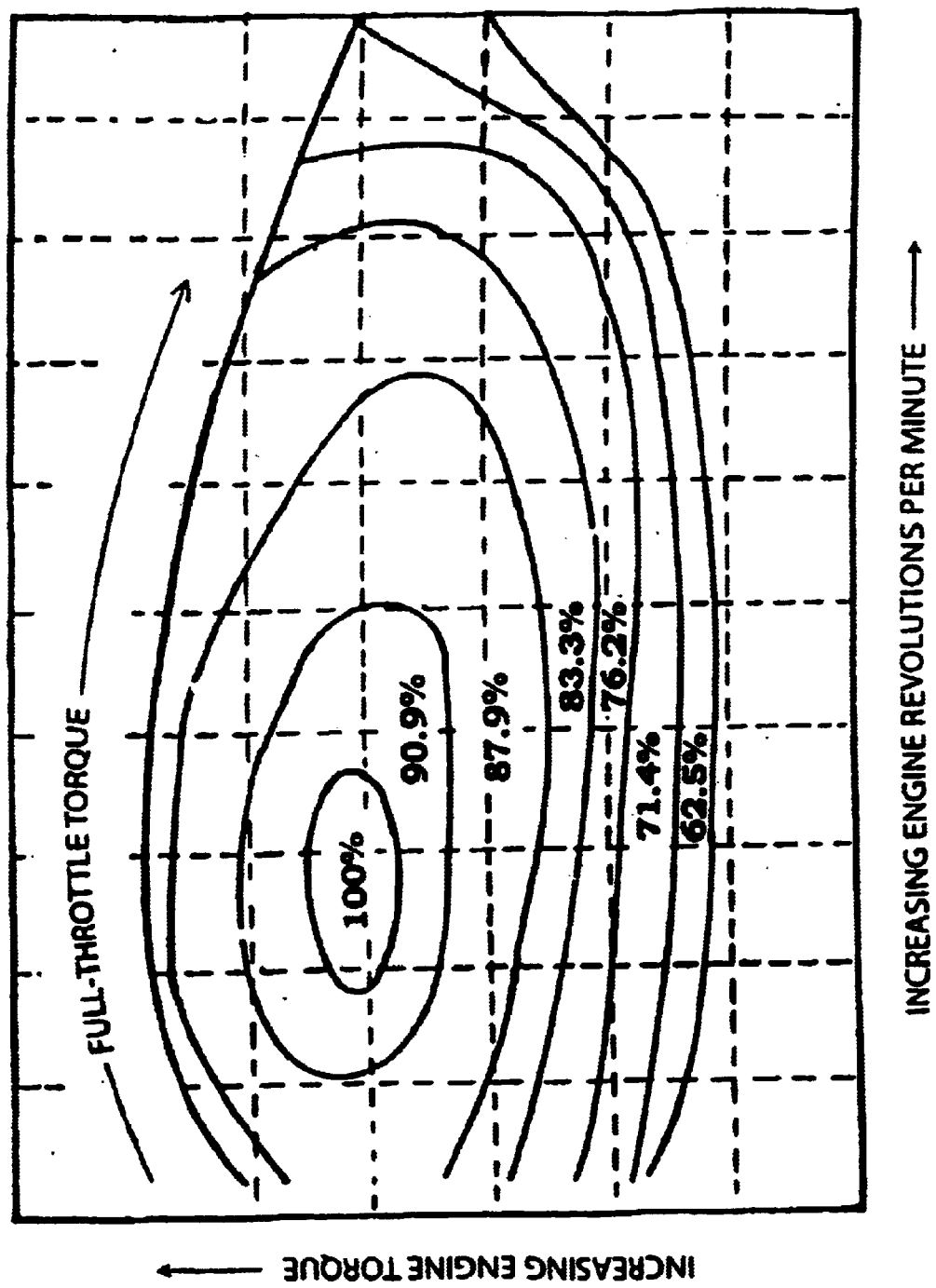
FIG. 1 is a graph of the efficiency of an internal combustion engine relative to the variation of torque and engine revolutions per minute.
Figure 2:
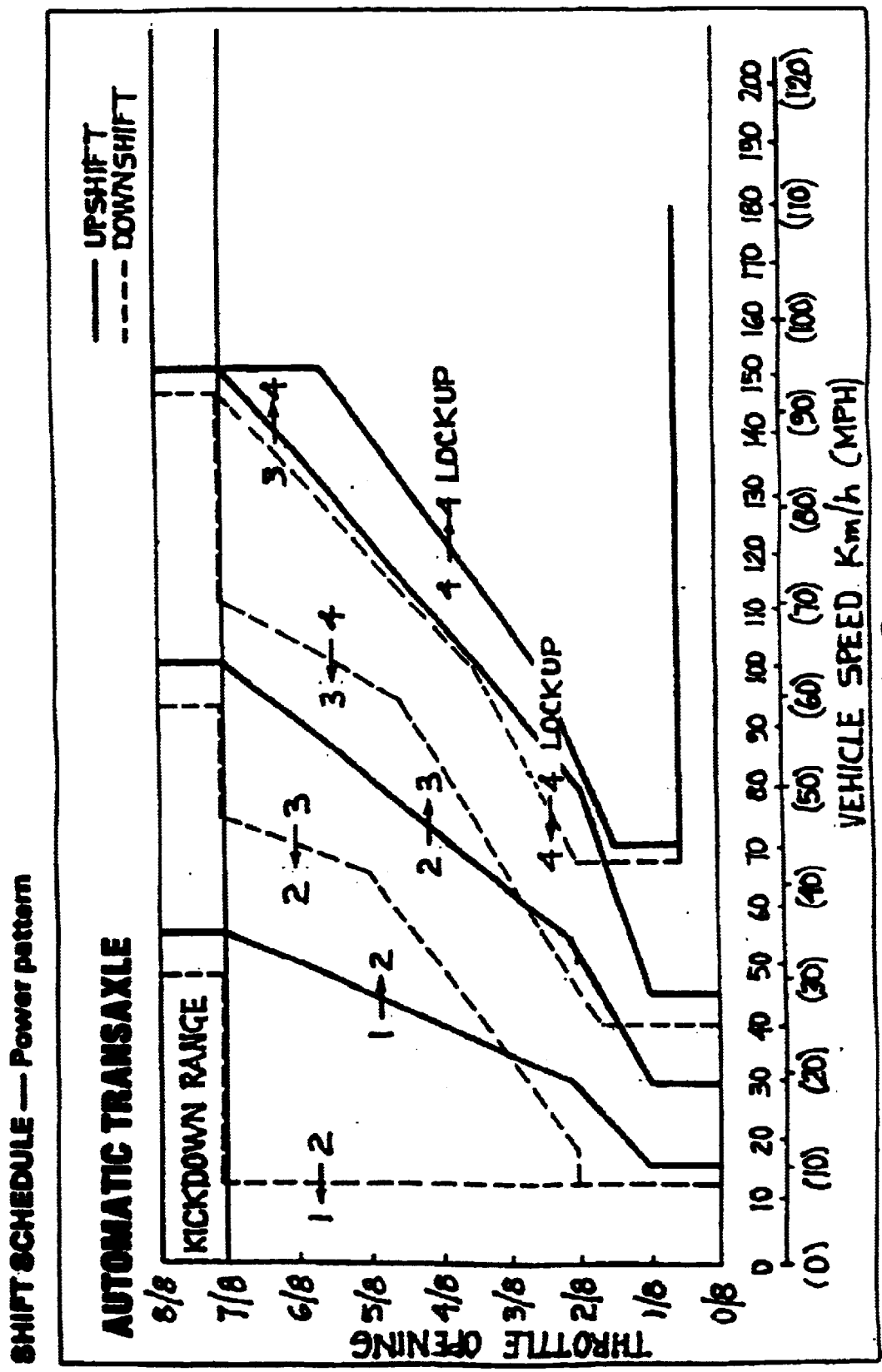
FIG. 2 is of a shift schedule, power pattern of automatic vehicle transmission showing steps in power input and vehicle speed.
Figure 3:
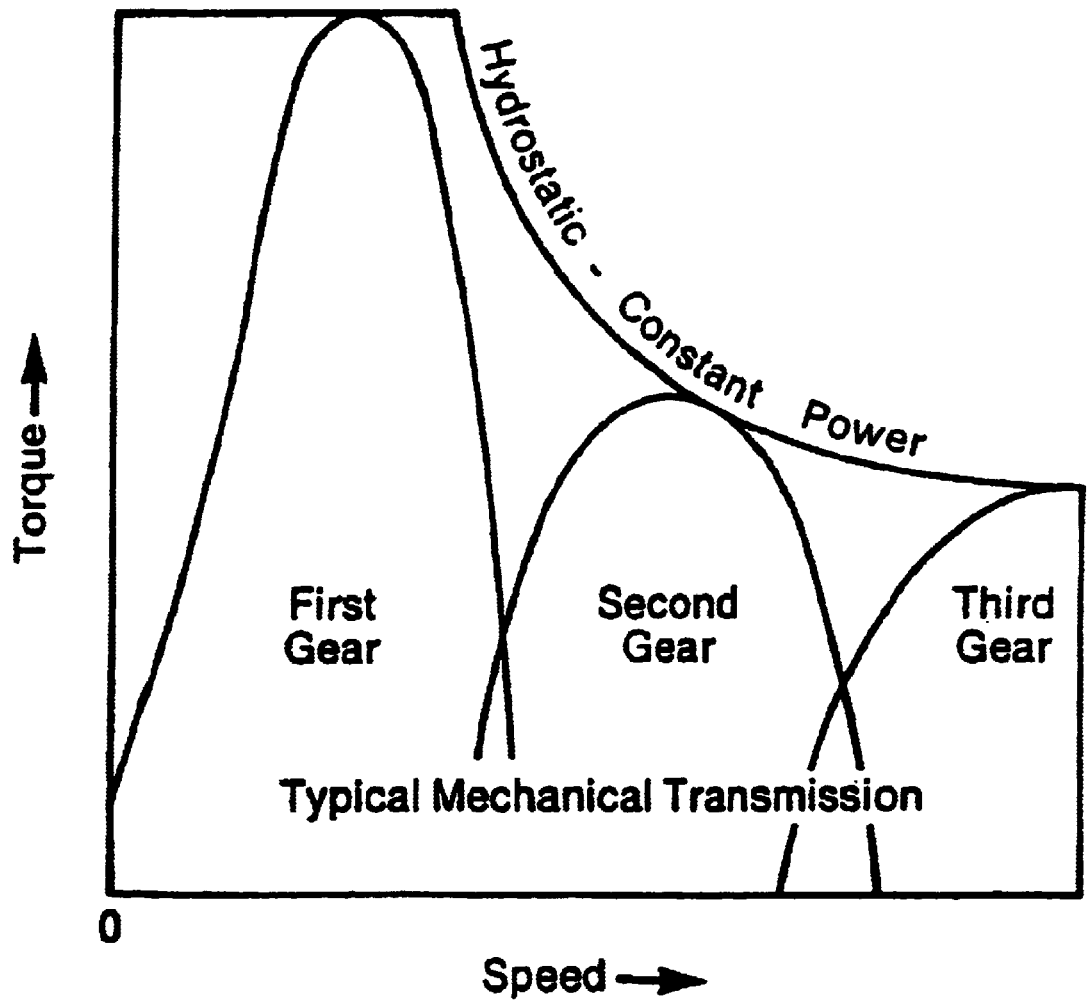
FIG. 3 is a graph showing the comparison between a multistepped conventional geared mechanical transmission and the powertrain transmission of this invention using the reactive force controlled by encaptured oil in a form of reverse hydrostatic transmission on the secondary drive line.
Figure 6:
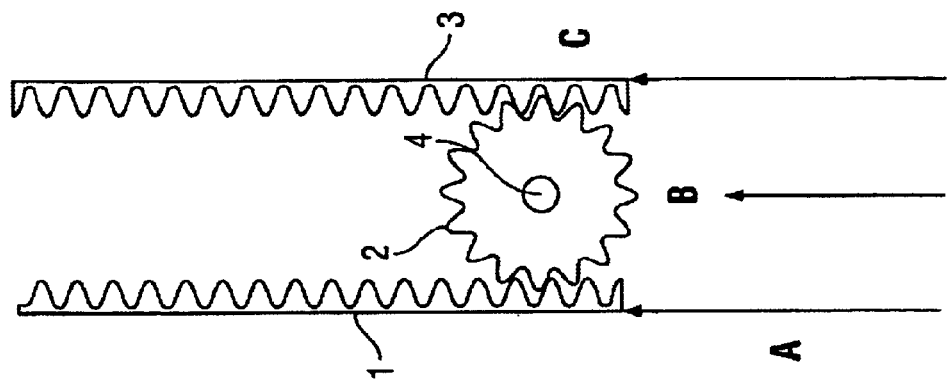
FIGS. 4, 5 and 6 are diagrams of the ratios and reactive forces associated with the primary and secondary input power drive lines and power output of the outer transmission.

In FIG. 6 if the primary power drive line input rack 1 is moved forward in the direction of arrow A by a distance of 30 teeth and if the secondary power drive line moves the spindle 4 in the direction of arrow B then it can be seen that sprocket 2 is restrained from rotation by the equal distance travelled by rack 1, gear spindle 4 and gear 2 and the teeth of gear 2 being engaged in the teeth of rack 1 preventing rotation. The result is that gear rack 1 and sprocket 2 will both travel as a fixed mass at equal speed in the direction of arrows A and B. It can be seen that with the teeth of gear 2 engaged in rack 3, it must also travel at equal speed in the direction of arrow C.

In most vehicle operations at a ratio of 1:1, the transmission will only be intermittently subject to reverse thrust FIG.

6 on rack 3 in the direction of arrow C. At such times the vehicle is decelerating by using the compression of the engine as a brake, or by means of an exhaust brake. At all other times the rack 3 will be subject to varying degrees of force in the opposite direction of travel and opposite to arrow C. This force is restrained by the engagement of the teeth of gear 2 engaging in the teeth of rack 3. The force applied to the gear 2 by rack 3 in the opposite direction of arrow C will attempt to rotate gear 2 around the spindle 4 in a clockwise direction which in a 1:1 ratio will be restrained by the gear rack 1 requiring a restraining force in the opposite direction to arrow A. The force required on spindle 4 in the direction of arrow B will be the sum of the vehicle driving load on rack 3 in the opposite direction to the rack movement being opposite to arrow C and the force required to restrain the gear 2 from rotating about spindle 4 by way of a restraining force applied to rack 1 in the opposite direction to the direction of movement and the opposite direction to arrow A.

It can be seen that at a 1:1 ratio the force required on the secondary drive line at spindle 4 will be in the direction of arrow B and will be equal to double the force of work being performed on power output rack C in the opposite direction to arrow C and that the force on the primary drive line rack 1 will be in the same direction and equal to the force of work performed acting against the power output rack 3 in the opposite direction of arrows C and A.

1:1.5 Ratio

Any ratio above 1:1 can be selected as an overdrive but for the purpose of illustration a ratio of 1:1.5 has been chosen. Using this ratio as shown in FIG. 6 if the primary drive line rack 1 is moved forward a distance of 30 teeth in the direction of arrow A and if the spindle 4 is moved forward a distance of 1.5 times that of rack 1 which will be equal to a total of 45 teeth, as the spindle 4 in gear 2 has moved 15 teeth further than rack 1 gear 2 will counter rotate anti-clockwise by 15 teeth. The net effect will be that the power output rack 3 will travel the same 30 teeth distance as that travelled by the primary drive rack 1 plus the additional 30 teeth distance caused by the anti-clockwise rotation of sprocket 2 moving the rack 3 a total distance of 60 teeth in the direction of arrow C and thus cause an overdrive of 2 times that of the primary drive line speed.

Figure 7:
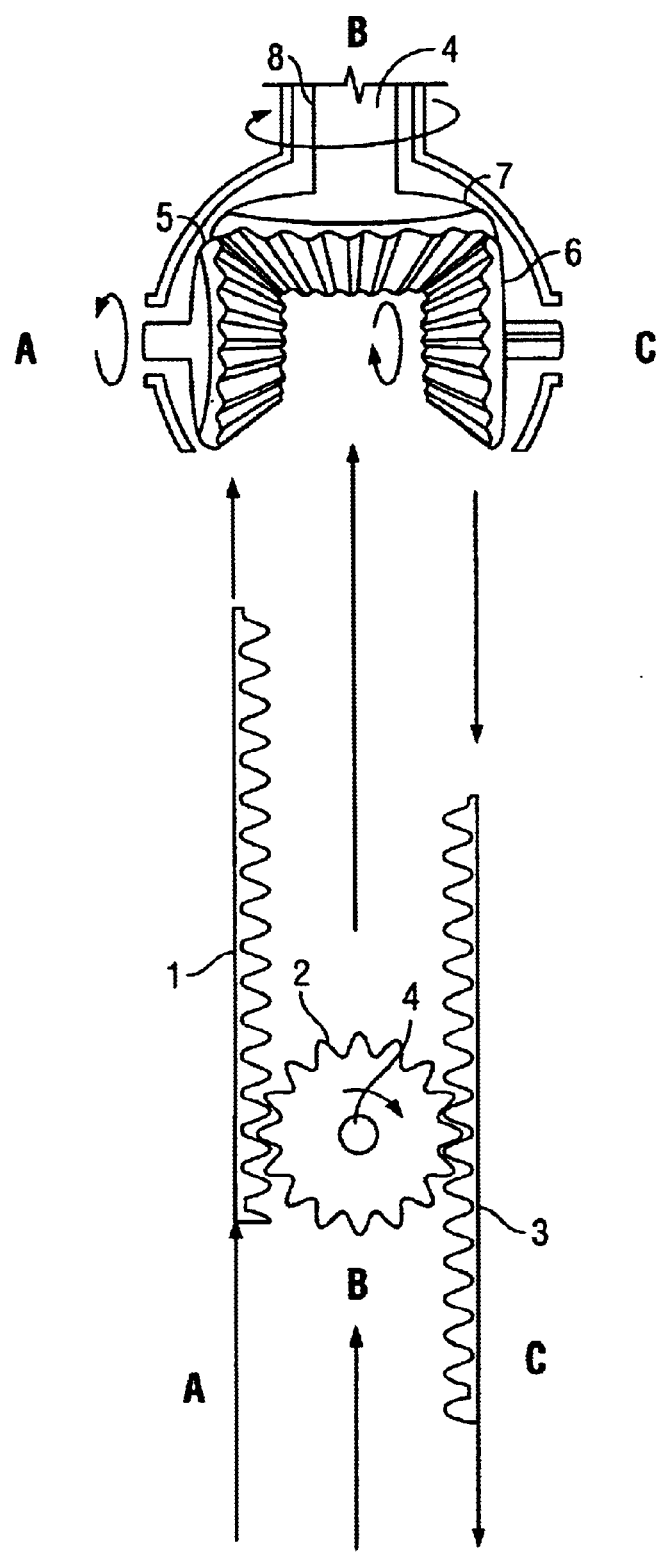
FIG. 7 is a diagram and partially sectioned diagrammatic view showing the illustrated ratios and reactive forces in linear form converted into a rotary form in the outer transmission.

For illustrative purposes FIG. 7 shows the primary power input drive line as a linear rack 1, the primary drive line being designated as A. The secondary power input drive line shown as spindle 4 and gear 2 which is able to freely rotate about spindle 4 and designated as secondary drive line B. The effects of the combination of ratios and reactive forces has been described in reference to FIGS. 4, 5 and 6 with the resultant power output in FIG. 7 at rack 3 being designated as C. The flat linear form of racks and gears has been used for the purpose of illustration and it will be readily appreciated that the same ratios and reactive forces apply if the racks 1 and 3 are replaced in the form of crown wheels 5 and 6 and the gear and spindle 4 is replaced with a pinion 7 and bearing 8.

If rack 1 is moved forward in the direction of arrow A and if the crown wheel 5 is viewed from the upper surface as moving in the same direction as the rack then the crown wheel will rotate anti-clockwise in the direction of the arrow at crown wheel 5. It will cause pinion 7 to rotate clockwise as viewed from the top having the same action as the flat profile gear 2, pinion 7 will rotate crown wheel 6 in the direction of the arrow of the power output crown wheel at C.

As explained in FIGS. 4, 5 and 6 the secondary power input drive line as shown in FIG. 7 moves the spindle 4 and thus gear 2 in the direction of the arrow at B. The same action is incurred by rotating the pinion 7 complete with the bearing assembly 8 rotationally around the central axis of crown wheels 5 and 6 being around the axis A–C.

It can be seen that although the ratios and reactive forces have been explained only in terms of ratios of 3:1, 2:1, 1:1 and 1:15 that the output speed variation and reactive forces are proportional to the input means in accordance to the following formula:

$$V\text{out} = 2 \times V\text{secondary} - V\text{primary}:$$

where Vout is the output speed, Vsecondary is the speed of the secondary input (the epicyclic gear assembly) and Vprimary is the speed of the primary input, with the output force corresponding to the vector analysis of the reactive forces of the two input means, The invention provides infinite stepless speed variation between all of the ratios from reverse through stationary dynamic lock up through to full speed and on to an overdrive. It is clear that the reactive forces generated must be restrained between the primary power input drive line designated A and the secondary power input drive line designated B so that they react against a common drive shaft thus avoiding loss of energy. To achieve this the invention allows for the variation of speed between the power input drive line A and drive line B to be controlled by the differential variation of displacement of rods of entrapped, oil or such suitable fluid in a rotating assembly to give a reverse differential hydraulic action providing variable speed and controlling the reactive forces generated by pinion 7 freely rotating in bearing 8 and the rotation of the pinion bearing assembly 8 about the axis of crown wheel 5 and 6 around axis A–C as shown in FIG. 7.

Figure 8:
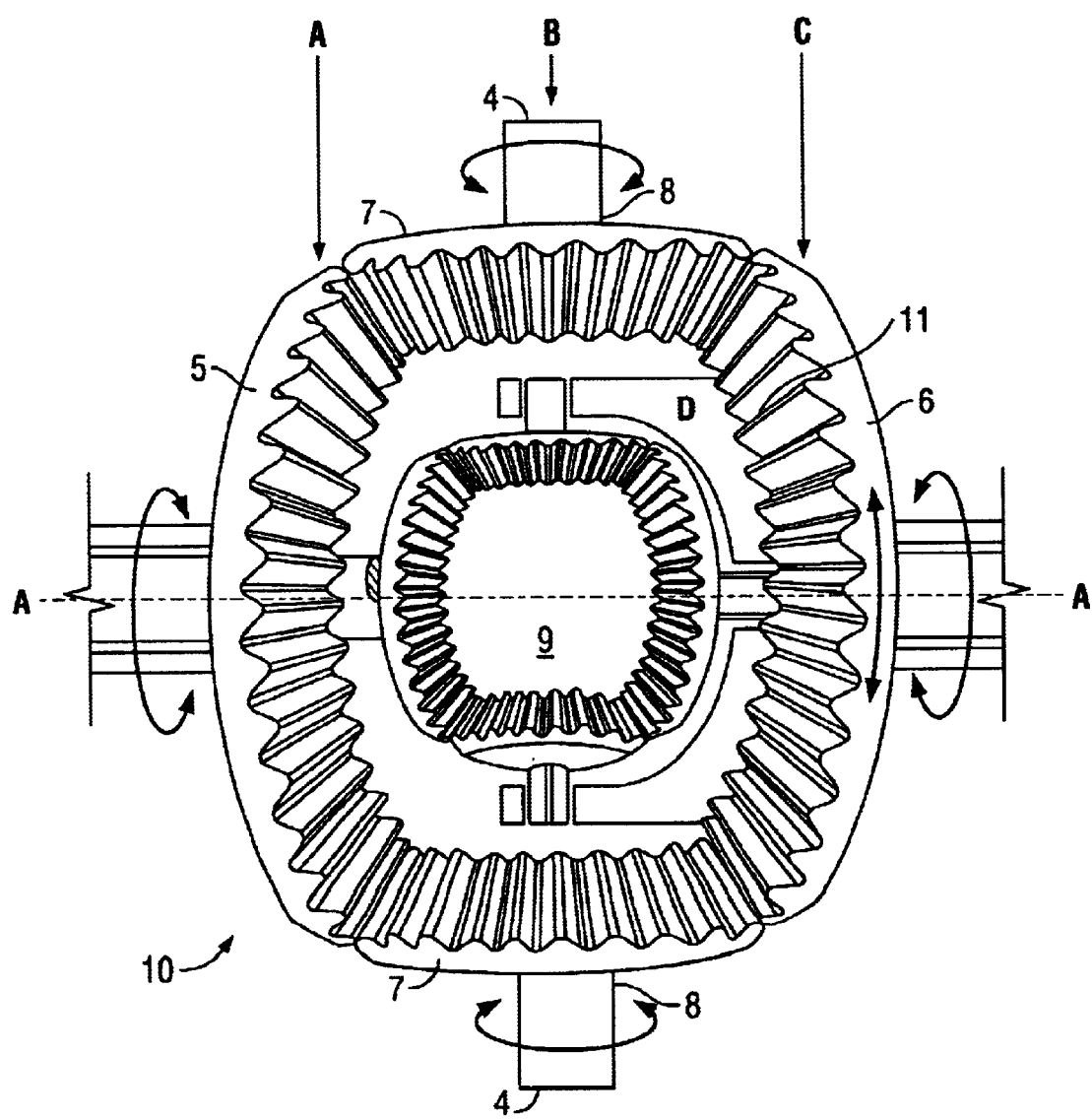
FIG. 8 is a partially cutaway diagrammatic view of an embodiment of a power transmission unit according to the first aspect of the invention covering the outer and inner transmission and the relationship and effect of the primary and secondary power input drive line.

This is more clearly shown in FIG. 8. The primary power input drive line is operably connected to the bevel gear 5 signified by arrow A. The secondary power input drive line which is controlled by the differential variable speed output and variable reactive torque by the dynamic differential reverse hydraulic control of entrapped oil or suitable fluid and provides the empowerment or restraint depending on reactive forces to the bearing 8 in which the pinion gear 7 is free to rotate as a reactive opposing rotational force designated as 8 rotating around the axis A—A. A further aspect that is related to the invention and disclosed in the applicant's previous applications is a differential 9 contained internally within the outer transmission 10. The output speed and force being to the speeds of the input means in accordance to the following formula:

$$V\text{out} = 2 \times V\text{secondary} - V\text{primary},$$

where Vout is the output speed, Vsecondary is the speed of the secondary input (the epicyclic gear assembly) and Vprimary is the speed of the primary input, with the output force corresponding to the vector analysis of the reactive forces of the primary drive line A and secondary drive line B with the output transferred to the bevel gear 6 and being designated as output power C. The bevel gear 6 imparts rotational force to the central differential by means of the rotatable carrier 20 and is designated as D.

The invention has the advantage of combining proven crown wheels, pinions and differential components proven and used in a wide range of vehicles, trucks and tractors but used in a unique novel combination with means to control speeds and reactive forces.

Figure 9:
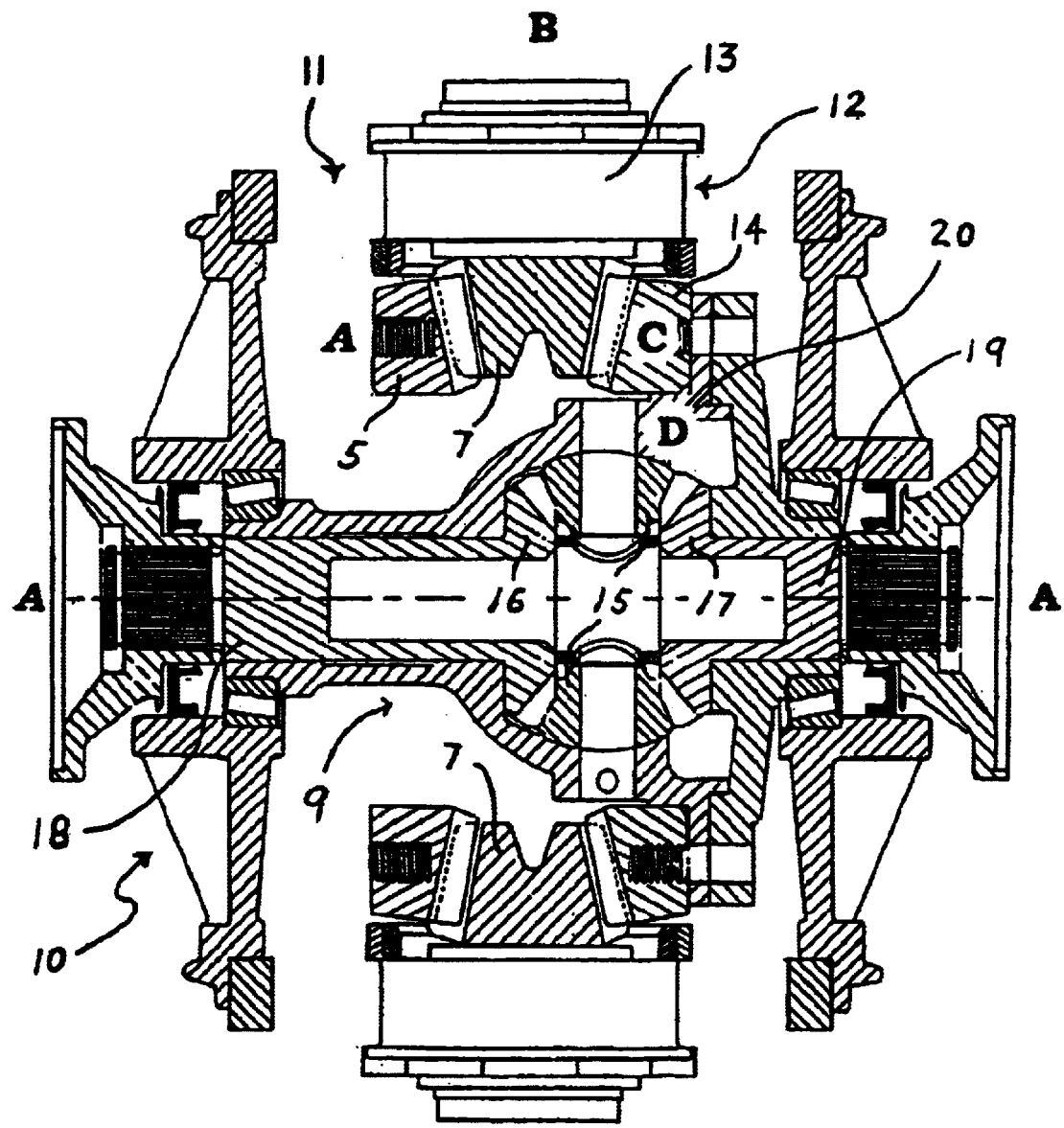
FIG. 9 is a sectioned view of a practical embodiment of the power transmission unit illustrated in FIG. 8 in relationship to the primary power drive line and the secondary variable power drive line from a singular power unit.

FIG. 9 shows the power transmission unit 10 in accordance with preferred embodiments of the first aspect of the invention generally comprises an outer main transmission 11 having two rotatable input means operably connected to rotatable output means and an inner differential gear assembly 9 having rotatable input means operably connected to two differentially rotatable output means. These components will now be described in more detail with various preferred embodiments being discussed.

The main transmission 11 of the power transmission unit 10 advantageously comprises a gear train. The two input means of the main transmission 11 comprises a first bevel gear 5 and an epicyclic gear assembly 12 coaxially arranged to rotate about a first axis A—A. The epicyclic gear assembly 12 comprises an annular pinion carrier 13 which rotatably supports internally arranged epicyclic bevel pinion gears 7 having axes perpendicular to the first axis A—A. As indicated by letters A and B in FIG. 9, the first bevel gear 5 and the annular pinion carrier 13 are each individually operably connectable by conventional means, such as gear, belt, chain or directly to the power input primary and secondary drive lines. The output means of the main transmission 11 comprises a second bevel gear 14 arranged coaxially with both the first bevel gear 5 and the epicyclic gear assembly 12 to rotate about the first axis A—A. The first and second bevel gears 5, 14 of the main transmission 11 each have a centrally formed and axially extending hole The epicyclic gear assembly 12 is arranged between the first and second bevel gears 5, 14 with the epicyclic bevel pinion gears 7 in mesh with both the first and second bevel gears 5, 14.

The differential gear assembly 9 is arranged internally of the main transmission 11. The input means of the differential gear assembly 9 of the power transmission unit 10 comprise differential bevel pinion gears 15 arranged radially inside the main transmission 11 to rotate about axes perpendicular to the first axis A—A. The output means of the differential gear assembly 9 comprise two differential bevel side gears 16, 17 coaxially arranged in mesh with the differential pinion gears 15 to rotate about the first axis A—A. The two differential side gears 16, 17 are centrally mounted on opposed ends of two coaxially aligned power output members 18, 19 such as half-axles, that extend axially outwards through the holes in the first and second bevel gears 5, 14 of the main transmission 11. The half-axles 18, 19 are operably connectable to drive wheels (not shown) or in the case of a four wheel drive the power transmission unit may be centrally mounted then the half axles 18, 19 are operably connected to the front and rear differentials. The main transmission 11 is operably connected to the differential gear assembly 9 by a differential frame 20 that is connected to the second bevel gear 14 of the main transmission 11 and which carries the differential pinion gears 15 of the differential gear assembly 9.

Figure 10:
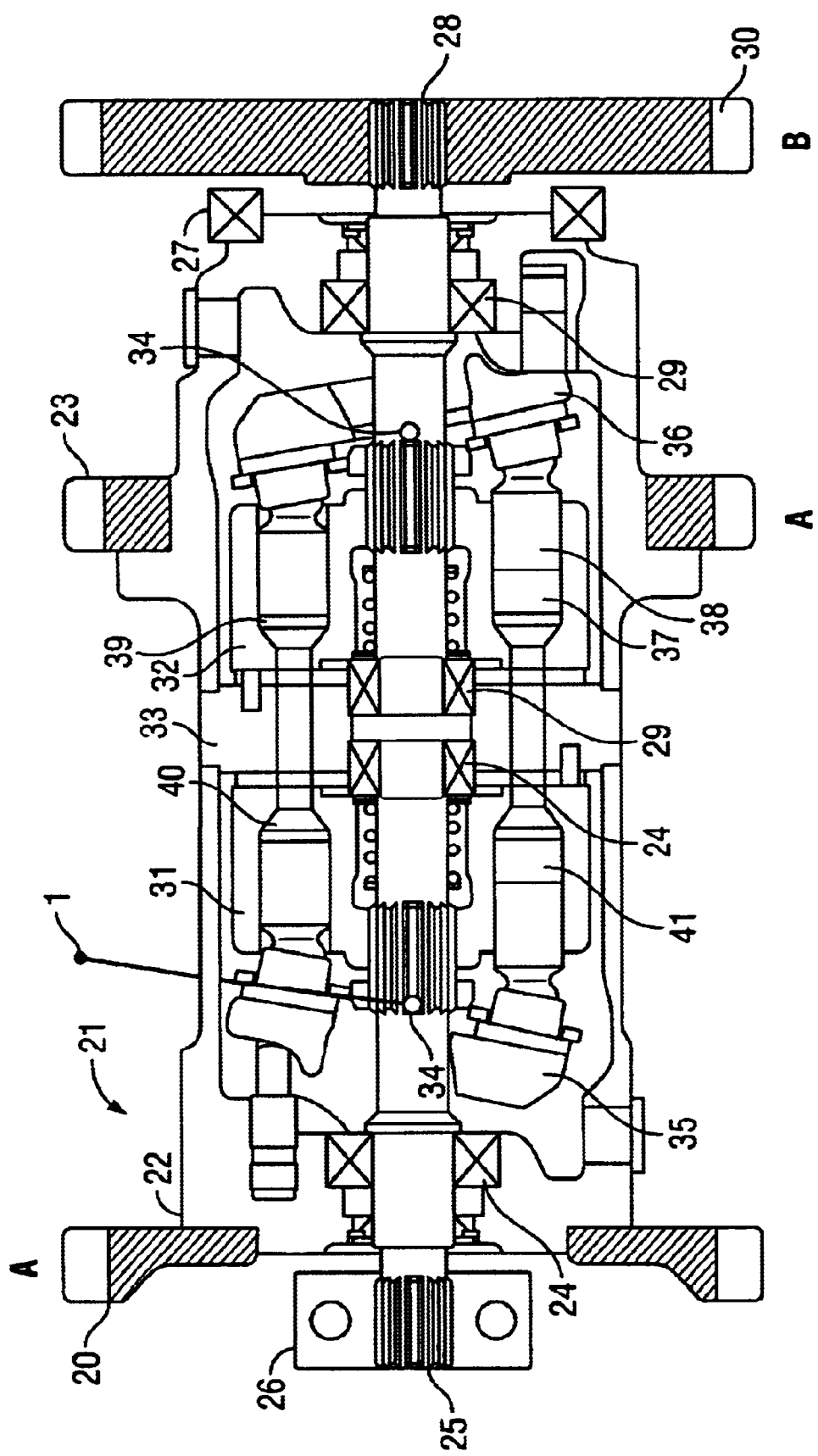
FIG. 10 is a partially sectioned diagrammatic view of an embodiment of the differential displacement hydraulic/mechanical variable secondary power drive line reactively connected and controlling the outer power transmission shown in a maximum displacement position.

FIG. 10 shows a practical embodiment of a power dividing device according to this invention used to provide the power input primary and secondary drive lines to the transmission from a single power source. This device provides differential displacement and dynamic mechanical/hydraulic control of variable revolutions per minute and control of reactive forces between the power input primary and secondary drive lines. The reaction of the forces being controlled without power loss by reacting against a common member which has a singular power input either directly connected to a singular power source or by conventional means such as a gear, "V" belt multi "V" power belt (with common connecting flat outer belt), a toothed belt, roller or special high speed or silent chain or by hydraulic means.

FIG. 10 for illustration purposes and in one preferred embodiment the power unit such as an internal combustion Otto or diesel engine is operably connected by gear which rotates the balanced assembly 21, the gear 20 is fixed to the housing 22 which transmits the primary input power line via the rotatable housing to gear 23 which is fixed to the housing. The housing is supported by bearings 24 on the fixed shaft 25 which is restrained from rotation by fixture 26. The housing is further supported at the opposite end by bearing 27. By this means power is directly transmitted via the primary drive line from the power unit via gear 20 through housing 22 to gear 23 at A. The output speed is determined by the gearing between the engine or power unit and assembly 22 and the direct variation of the revolutions of the input power unit to gear 20 at A.

A second shaft 28 which is separately rotatable and independent from shaft 25 is supported by bearings 29 and directly connected to gear 30 which delivers the hydraulic mechanical differential power through gear 30 providing the power input secondary drive line at B.

The fixed shaft 25 has a stationary circular piston group 31 restrained from rotating by the spline on fixed shaft 25. The rotatable shaft 28 which is supported by bearings 29 is attached to the rotatable piston group 32 by way of a spline, thus operably connecting piston group 32 with shaft 28 and secondary drive line gear or sprocket 30 to provide reactive force at B. The rotatable housing 22 has attached to it a common porting and commutator plates 33 between the piston group 31, 32. The common porting and commutator plates assembly 33 is fixed to and rotatable with housing 22. This ensures the high and low pressure kidney shaped porting on each side of the circumference of assembly 33 always stays aligned with the fixed pivotal points 34 of both the reactive displacement rotating group 31, swash plate control swash plate 35, and the fixed displacement swash plate 36 relative to the rotating housing 22.

The invention provides differential hydraulic/mechanical speed variation and torque force reactive control between the primary power input fixed drive line A and the secondary variable power drive line B. This is achieved by the primary drive line input gear or sprocket 20 at input A being fixed to the housing 22 and rotatably and operably connected directly to the primary drive line sprocket or gear 23 for primary power delivery at A, the torque force and revolutions per minute being controlled directly by the speed and torque of the input power unit to gear or sprocket 20 at A and transferred directly to gear or sprocket 23 at A. The reactive forces transferred from the secondary power input B as described in FIGS. 4, 5, 6, 7 and 8 reacts directly against sprocket or gear 30 at B as shown in FIG. 10. The gear 30 is restrained from rotating by shaft 28 and rotating group 32 which in turn is restrained from rotating by the control of entrapped oil in cylinder 37 being displaced by piston 38 in contact with the fixed angle swash plate 36 as the reactive forces rotate the piston group 32 relative to the fixed angle swash plate 36 the entrapped rod of oil 37 is displaced by piston 38 as it rotates toward cylinder position 39. The amount of rotation allowed will be dependent on the variable angle of the swash plate 35 as the displaced oil is free to transfer via the kidney shaped porting on each side of the circumference of the commutator assembly 33 which remain fixed and relative to the swash plate pivotal points 34 and rotates with housing 22. It can be seen that the entrapped rods of oil in cylinder 37 can be freely transferred through the kidney shaped part extending almost 180° around the circumference and allows the oil via the commutator assembly 33 to transfer to cylinders 40 and 41 as the rotating piston assembly 31 is stationary and the swash plate 35 is driven by rotation of the housing 22. The displacement space in cylinder 40 increases as the swash plate travels to cylinder position 41 thus allowing the control of the transfer of entrapped oil from cylinders 37 to the expanding cylinders between 31, 41. It will be seen that if primary input gear 20 rotating housing 22 and in turn driving swash plate 35 via way of the fixed swash plate pivotal point 34 relative to housing 22 and if the swash plate control angle is set at position 1 being equal to the fixed angle of swash plate 36 that the displacement of the rods of entrapped oil in rotating piston assembly 32 will be identical to the expanding displacement chambers in the fixed rotating piston assembly 31 thus allowing the reactive forces from the outer transmission to react at B against gear 30 via shaft 28 to rotate backwards relative to the primary drive sprocket 20 and housing 22. This means under full speed input and full power input into gear 20 at A that the output speed on gear 30 will be zero and the reactive forces fully restrained without loss of energy due to direct hydraulic/mechanical variable control interacting mechanically within the rotating mechanical housing 22.

Figure 11:
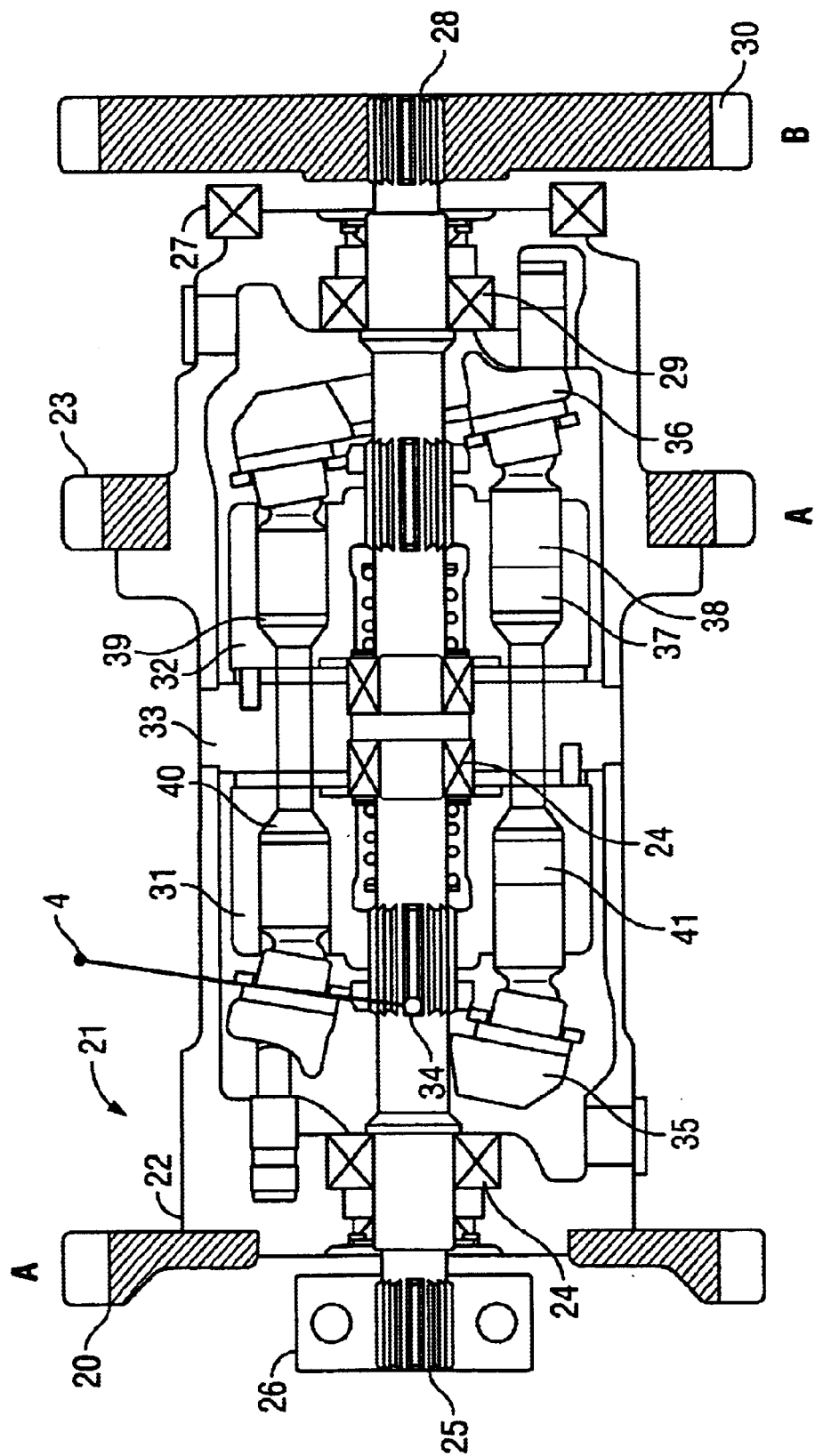
FIG. 11 is a partially sectioned view of the secondary power drive line illustrated in FIG. 10 in zero displacement position.

FIG. 11 shows the same general arrangement as FIG. 10 but with the swash plate 35 controlled around axis 34 by an adjustable means located in operative position 4. As the input primary drive line power at A rotates gear 20 and housing 22 it also operates swash plate 35 at the same ratio of 1:1 regardless of the position of the angle of swash plate 35. If the swash plate 35 angle is set at position 4 which is at 90° to centre line of shaft 25 then it can be seen there is no variation of the displacement between piston chambers 40, 41 and any flow of entrapped oil from cylinders 37, 39 will be zero. As the power input primary drive line transferred through gear 20 at A via housing 22 and gear 23 into the outer mechanical transmission primary drive line input 1 as shown in FIGS. 7, 8, 9, the reactive forces covered in FIGS. 4, 5, 6, 7 and 9 will react against gear 30 at B as shown in FIG. 11. Gear 30 is restrained by shaft 28 and rotating piston group 32 with piston 38 being unable to transfer the entrapped rod of oil in cylinder 37 through the commutator assembly 33 due to zero displacement variation in the fixed piston assembly 31. The net effect being that the entire assembly 21 rotates as one with the primary power input and output sprockets 20, 23 and the secondary reactive power control sprocket 30 at B all rotating in unison at a 1:1 ratio.

Figure 12:
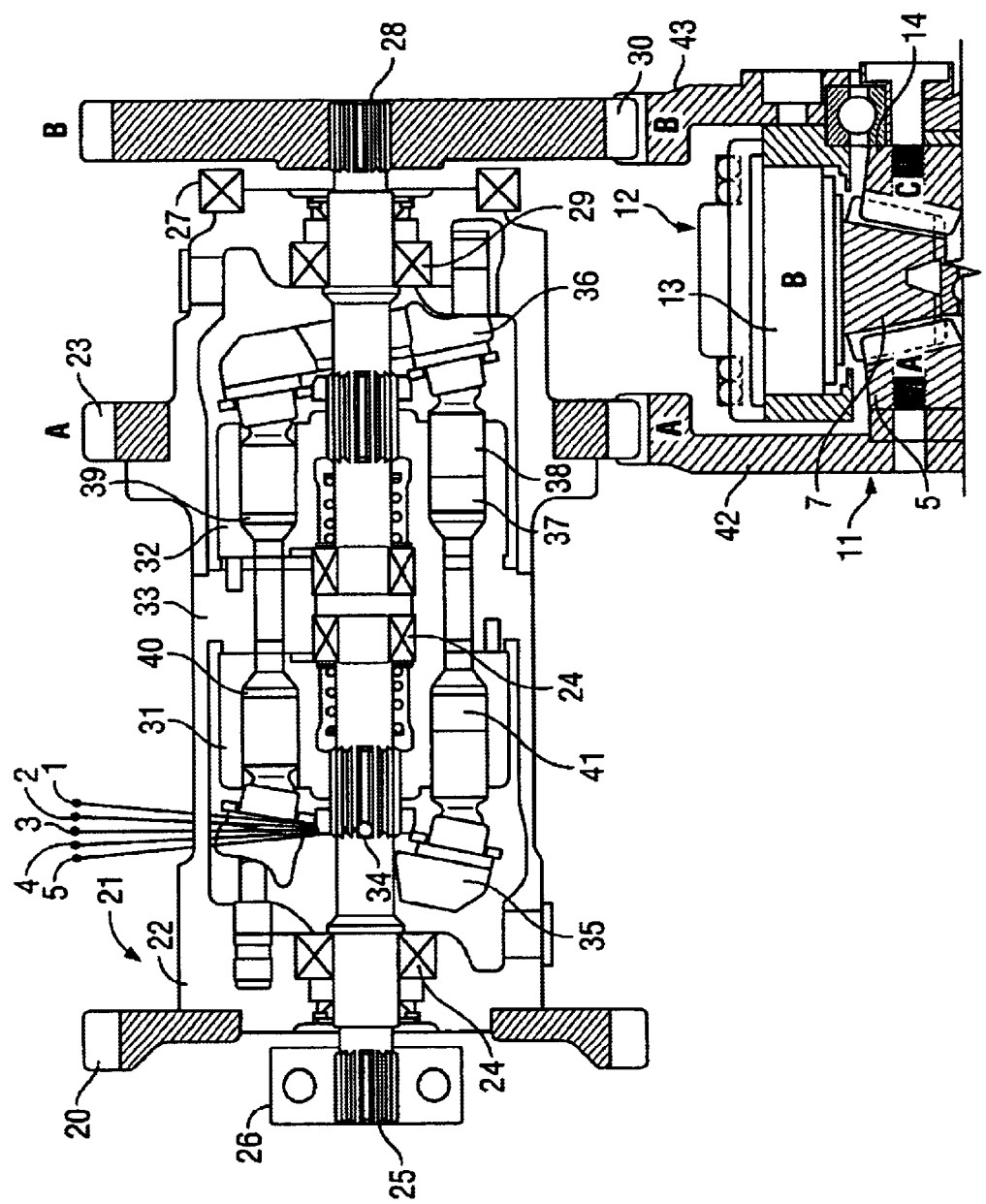
FIG. 12 is a partially sectioned view of the secondary power drive line illustrated in FIGS. 10 and 11 showing the full range of displacement and the resultant control of the ratios and reactive forces directly connected to the primary and secondary power drive lines to the outer power transmission and the resultant outputs.

FIG. 12 is also similar to FIGS. 10 and 11 but additionally shows by way of illustration five operative positions of the swash plate 35. Position 1 would have the output gear or sprocket 23 delivery power via the primary drive line to outer transmission sprocket 42 at A in direct correlation with the speed and torque provided by the power unit as described in FIGS. 10 and 11. If the swash plate 35 control angle is positioned at control position 1 then the function as explained in FIG. 10 will occur with reactive forces transferred through the annular pinion carrier 13 at B and connected to sprocket or gear 43 will control the reactive forces which change in direct correlation with the variation of input and output loads and the direction of the forces as described in FIGS. 4, 5, 6 and 7 while still maintaining zero rotation.

If the swash plate 35 control angle is changed to position 2 then the displacement will allow the reactive forces on gear or sprocket 30 to be controlled with the secondary power drive line at B being one third that of the primary power drive line at A. This produces a 3:1 ratio input into the main transmission 11 giving one third of the input r.p.m. in a reverse output via transfer of speed and energy transmitted via bevel pinion gear 7 to the bevel gear 14 at C.

FIG. 12 shows that with the swash plate angle set in position 3 there will be displacement allowing the secondary power drive line at B to revolve at half the speed of the primary power drive line A. The effect as described in FIGS. 4, 5, 6 and 7 will be a 2:1 ratio into the main transmission 11 which will produce a dynamically locked neutral position with zero output from the main transmission 11 FIG. 12 shows that with the swash plate 35 set at position 4 which is at 90° to the shaft 25, the effect will be a 1:1 ratio input between the primary power drive line A and the secondary reactive power control drive line B as fully described in FIG. 11. Thus the 1:1 ratio, of inputs controlling the correlation of speeds and interactive torque forces in the main transmission will produce a 1:1 full forward output from the transmission via the second bevel gear 14 at C, the net effect being that oil transfer flow from the piston rotating group shown in FIG. 12 cylinder 37 will be nil. There will be no movement of the piston rotating group 32 relative to the housing and all components in the differential displacement hydraulic/ mechanical reactive power control unit 21 will rotate in unison with the exception of the fixed shaft 25 and fixed piston group 31 which remain stationary at all times, The 1:1 provision of equal r.p.m. at the primary drive line A and B and the control of reactive energy by the power control drive line at B will result in zero movement of all components in the main transmission 11. Thus it can be seen for applications in vehicles, trucks and tractors that at zero speed there is only 2:1 variation of primary and secondary power drive line speeds with the secondary drive line B doing half of the r.p.m. of the primary power drive line and with a smooth transition to 1:1 ratio that maximum efficiency to match variable loads can be made instantaneously and precisely.

As shown in FIG. 12 if the control position of the swash plate 35 is advanced to position 5 then a ratio of 1:1.5 can be effected resulting in an overdrive output from the main transmission at C equal to 1.5 times the primary power input drive line rotational speed as previously described in FIG. 6.

A further aspect of the invention shown in FIG. 12 is that the rotating housing 22 is filled with hydraulic fluid to a point that when rotating the centrifugal force causes the oil to create a pressure towards the outer circumference of the rotating housing 22 and the enclosed oil mass. This pressure in one embodiment of the invention will act as a charge pressure to fill the radially disposed cylinders 40, 41, 37, 39 and the cylinders radially disposed between them which are also positioned in the outer circumference of the piston group 31, 32 and in the zone of high pressure hydraulic fluid. The normal use of high and low pressure check valves can be used and for certain applications an integral charge pump may be used.

A further embodiment of the invention (not shown) provides for the rotating housing 22 to have extending cooling fins and/or rotary seals to allow the transfer of hydraulic fluid out of and into the housing 22 for filtration and cooling.

In another embodiment the rotating piston group and/or the commutator plates will be constructed of ceramic material for high speed, high pressure, low lubrication and high efficiency performance.

The variable angle swash plate 35 can be controlled by a suitable arm and thrust, bearings or by appropriately ported pressure control or by remote radio frequency or infrared control to allow for control of the swash plate angle within the rotating housing 22.

Figure 13:
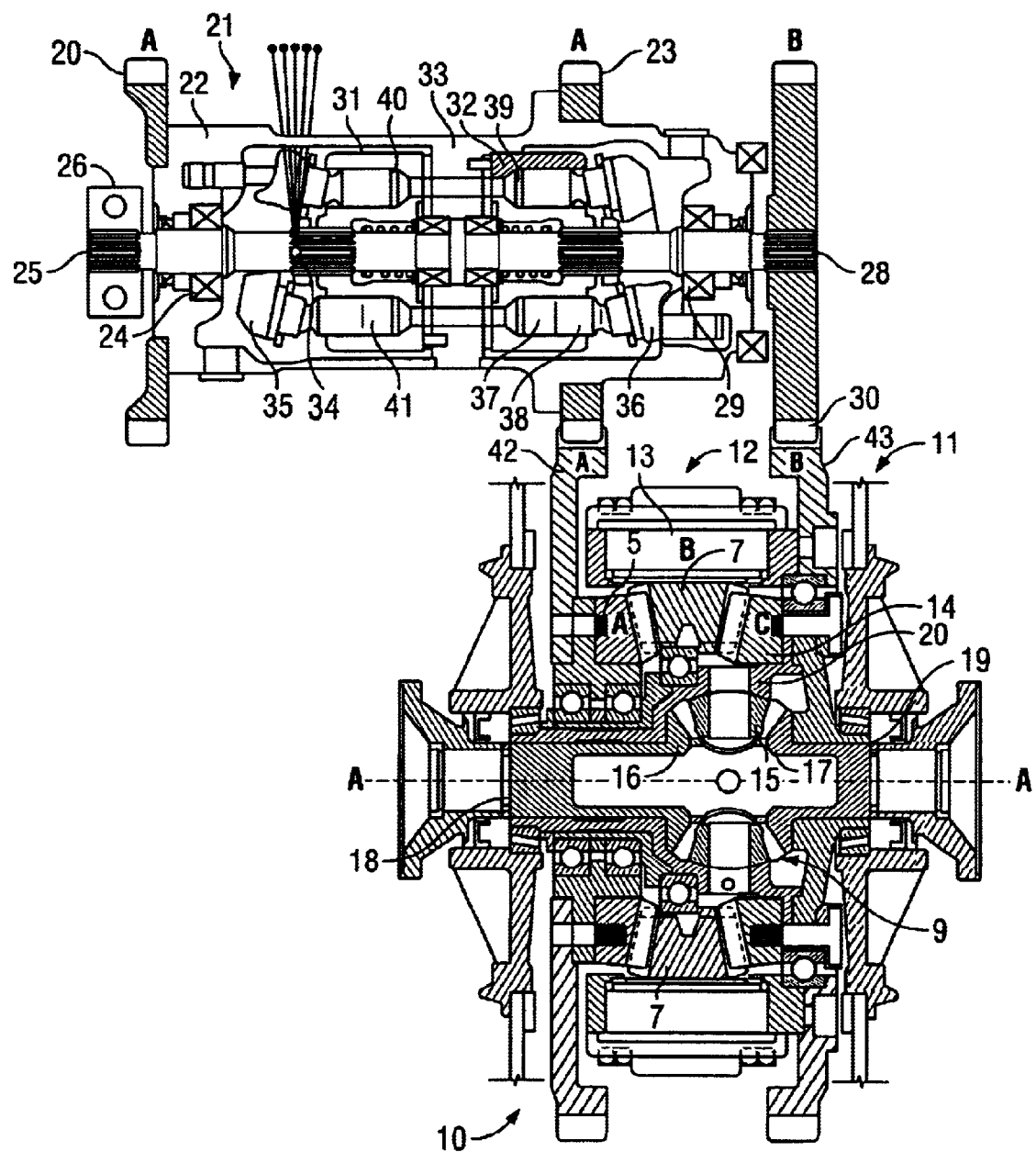
FIG. 13 is a cutaway view of a practical embodiment of the power transmission unit partially illustrated in FIG. 12 and the inter-relationship of one embodiment of the differential displacement dynamic hydraulic/mechanical variable secondary power drive line and the primary power drive line shown in FIGS. 10, 11 and 12 suited for universal location and application in front wheel drive, rear wheel drive and four wheel drive vehicles, tractors and trucks including direct replacement of differentials and gearbox if located in the traditional location of the differential in front and rear axle driven cars, trucks and tractors.

FIG. 13 shows a practical embodiment of the unified arrangement of FIGS. 9 and 10 including the bearings, seals and mounting configurations required for an operating assembly. These components can be varied in practice and although their function will be readily appreciated by those skilled in the art a description is not required for an understanding of the invention.

In use, the main transmission 11 described above comprises a continuously variable transmission wherein the output speed (the speed of rotation of the second bevel gear 14) will be proportional to the sum or difference of the two input speeds delivered from the integration of the assembly 21 and providing a primary and secondary variable speed and torque drive lines designated as A and B (controlling the speeds of rotation of the first bevel gear 5 and the epicyclic gear assembly 12). It will thus be appreciated that if the, speeds of the first bevel gear 5 and the epicyclic gear assembly 12 are controlled, the speed of the second bevel gear 14 may be varied progressively from a design maximum in a first direction of rotation, through zero, to a design maximum in a second opposite direction of rotation. As also described above, the differential gear assembly 9 operates in the manner of a conventional automotive differential gear. The power transmission unit 10 described above thus conveniently integrally combines the functionality of the main transmission 11 and the differential gear assembly 9 such that input rotational power may be differentially transmitted to two half-axles 18 and 19 at continuously variable output speeds.

The operation of the power transmission unit 10 described above may be further understood with reference to the exemplary embodiment illustrated in FIG. 9 wherein the first bevel gear 5 and the second bevel gear 14 of the main transmission 11 each have thirty teeth, and the epicyclic bevel pinion gears 7 of the main transmission 11 each have ten teeth.

The effect of different ratios of inputs in the same direction of rotation about axis A—A for the exemplary embodiment illustrated in FIG. 9 is described below.

1:1 Ratio of Inputs from Primary and Secondary Power Drive Lines A and B Integrally Connected to form a Hydraulic/mechanical Reactive Power Control Unit 20

If the first bevel gear 5 as shown in FIG. 9 is turned forward by one turn, thirty teeth of bevel gear 5 have been rotated forward. If at the same time annular pinion carrier 13 has been rotated forward one turn in the same direction about axis A—A each epicyclic bevel pinion gear 7 will have remained stationary. In consequence, the non-rotating bevel pinion gears 7 with gear teeth engaged in the second bevel gear 20 will cause bevel gear 14 and the differential frame 20 to rotate forward one full turn about axis A—A. The differential pinion gears 15 carried by the differential frame 20 are only restrained by differential side gears 16 and 17 which are operably connected to half-axles 18 and 19 respectively to allow a normal automotive differential action between two drive wheels (not shown).

The result shown in FIG. 13 is that, with a ratio of inputs provided by differential hydraulic/mechanical reactive power control unit 21 shown in FIG. 13 between the first bevel gear 5 and the annular pinion carrier 13 at 1:1, the speed ratio through the power transmission unit 10 and to the differential frame 20 is 1:1.

2:1 Ratio of Inputs by Integration With Differential Power Control Unit 21 and Power Transmission Unit 10

If the first bevel gear 5 FIG. 9 is rotated forward by one turn, moving forward thirty teeth, and if the annular pinion carrier 13 is rotated in the same direction about axis A—A forward half a turn (2:1) then each epicyclic bevel pinion 7 will have rotated in reverse around axes perpendicular to axis A—A by fifteen teeth and travelled at the point of engagement at the second bevel gear 14 by fifteen teeth for the half turn. As the second bevel gear 14 has thirty teeth and the annular pinion carrier 13 and bevel pinion gears 7 have travelled half a turn, then the thirty toothed second bevel gear 14 and the differential frame 20 remain stationary.

The result is that, with the ratio of inputs provided by the power control unit 21 as shown in FIG. 13 between the first bevel gear 5 and the annular pinion carrier 13 at 2:1, the second bevel gear 14 and the differential side gears 16 and 17 will remain in an effectively locked stationary position with zero output from the power transmission unit 10.

3:1 Ratio of Inputs

If the first bevel gear 5 is turned forward one turn by thirty teeth and if the annular pinion carrier 13 is rotated forward in the same direction about axis A—A one third of a turn, then each epicyclic bevel pinion gear 7 will counter-rotate backwards by twenty teeth while travelling the equivalent distance of ten teeth around the second bevel gear 14. Therefore, the second bevel gear 14 and the differential frame 20 will rotate in reverse by ten teeth, or one third in reverse. As described above, the differential gear assembly 9 allows for a normal automotive differential action between two drive wheels (not shown).

The result is that, with the ratio of inputs between the first bevel gear 5 and the annular pinion carrier 13 at 3:1, the second bevel gear 14 and the differential frame 20 will rotate one third of a turn in the reverse direction about axis A—A.

It will be appreciated that overdrive can be obtained by a ratio of inputs less than unity. In view of the above description, it will be appreciated that embodiments of the integrated power transmission unit of the present invention provide a compact, integral combination of a continuously variable transmission with a conventional automotive differential that is suitable for use in vehicle powertrains, particularly, though not exclusively, in vehicle powertrains but also for front-wheel drive vehicles mid-mounted for four wheel drive vehicles, trucks and tractors, in elimination of gear boxes by replacement of rear-wheel drive differential assemblies with the invention in vehicles, trucks and tractors. In particular, embodiments of the transmission of the present invention enable two vehicle drive wheels to be differentially driven at continuously variable speeds of rotation or front and rear axles to be differentially driven.

As shown in the accompanying FIGS. 8, 9 and 13 a vehicle powertrain in accordance with the preferred embodiments of the second aspect of the invention generally comprises an integral integration of a singular power input unit connected with a differential hydraulic/mechanical reactive power control unit 21 and the power transmission unit 10, the integration and combination of which is described above.

Figure 14:
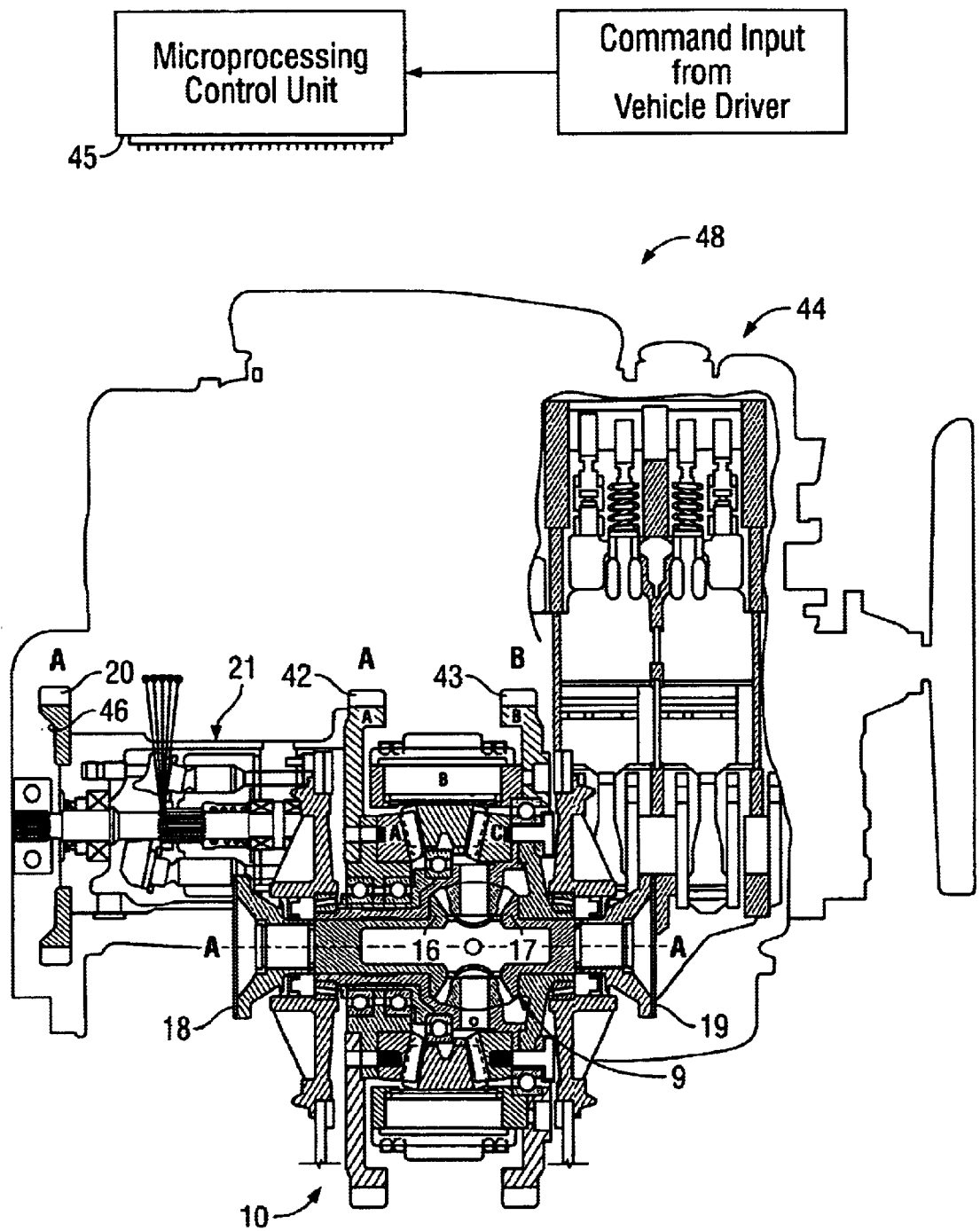
FIG. 14 is a partially sectioned diagrammatic view of the Otto and diesel engine embodiment of the power train according to the second aspect of the invention showing the inter-relationship of the Otto or diesel engine, the primary and secondary power line control illustrated in FIG. 12 and the power transmission illustrated in FIG. 13 in a preferred embodiment with power outputs in relationship to the engine in a location best suited for transverse engine mounted front wheel drive vehicles.

In FIG. 14 a power unit 44 a differential displacement hydraulic/mechanical variable speed torque reactive secondary power driveline unit 21 transmission unit 10 and a microprocessing control unit 45 are shown. These components will now be described in more detail with various preferred embodiments being discussed.

The foregoing detailed description of the construction, arrangement and operation of the various components of the power transmission unit 10 will be referred to in the following description.

In the embodiments illustrated in FIG. 14, the power unit 44 is comprised of an internal combustion engine alternatively any similar or dissimilar combination of any of the range of conventional internal combustion engine types—including the Otto engine, the diesel engine, the rotary engine, true rotary balanced engine, the gas turbine engine, or conventional electric motor types, fuel cell powered electric motors, electric and/or mechanical flywheels may be used. The Otto and diesel internal combustion engines are preferred because they represent established technologies with relatively low production costs. In the embodiment illustrated in FIG. 14 the power unit 44 comprises an Otto or diesel engine power unit.

Conveniently the differential hydraulic/mechanical power control unit 21 is located to transfer the drive via matching gear, chain, or belt from the crankshaft at the rear of the engine to gear or sprocket 20 and transfer the primary and secondary power input drive line to the centre of the engine/power unit 44 and via gears or chains or belts from the power control unit 21 primary and secondary drive at A and B to the drive gears or sprockets 42 and 43 of power transmission unit 10 which will be positioned centrally in relation to the transverse engine 44 at a position most suited for front wheel drive applications with the half-axles 18 and 19 in the appropriate position to connect standard front wheel drive shafts to the front wheels The housing of the power control unit 21 and the power transmission 10 is also conveniently arranged to be readily attached or removed from the engine 44.

Figure 15:
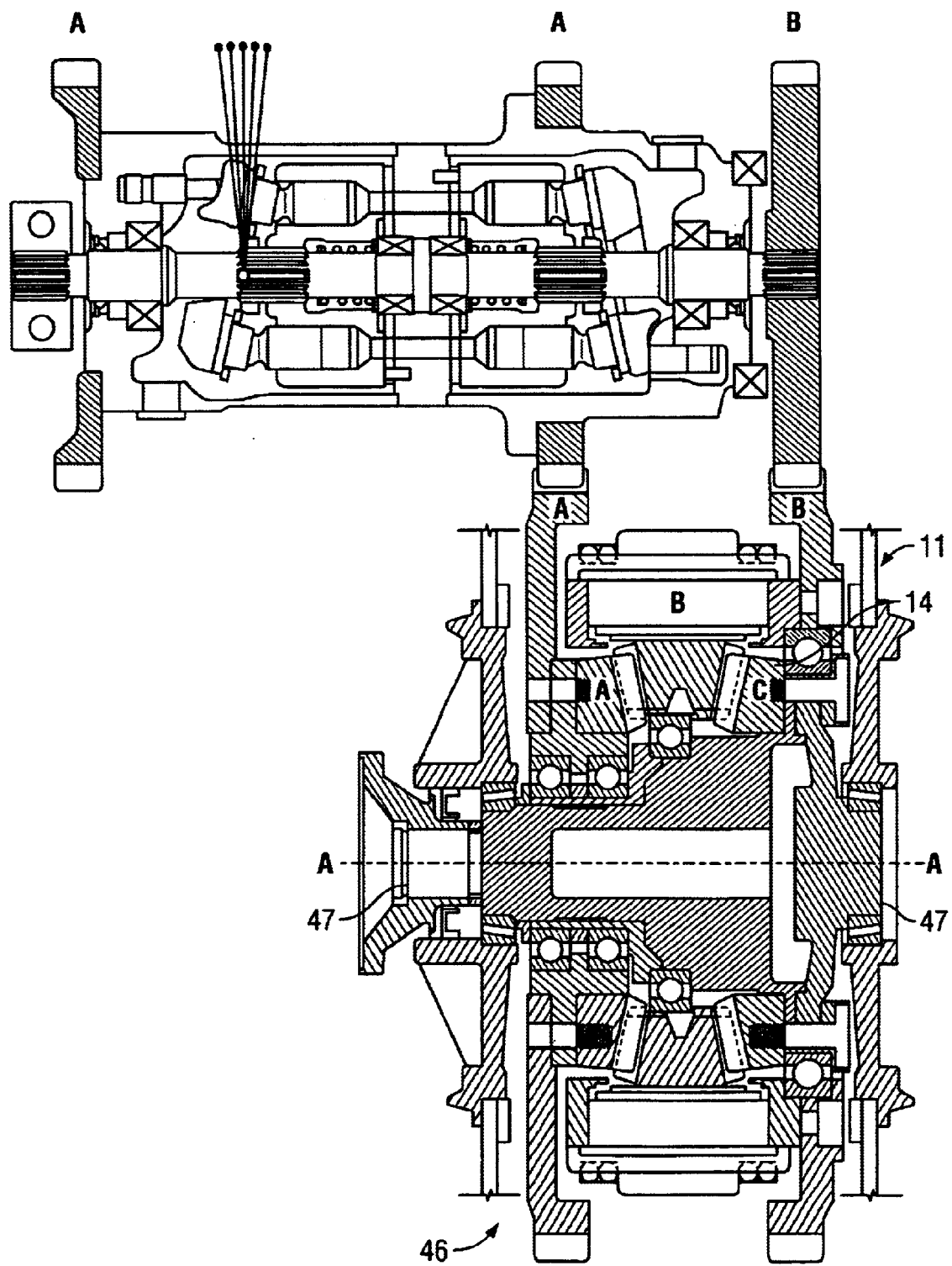
FIG. 15 is a partially sectioned diagrammatic view of a simplified embodiment of the power train illustrated in FIG. 14 suited for rear power output for traditional inline engine locations in vehicles, trucks and tractors.

FIG. 15 illustrates a simplified embodiment of the vehicle powertrain 46 illustrated in FIGS. 9 and 10 wherein the second bevel gear 14 of the power transmission unit 10 is not operably connected to an inner differential gear assembly that is, the power transmission unit 10 only includes the main transmission 11, but is instead operably connected to a drive shaft 47. The simplified embodiment of the vehicle powertrain 46 illustrated in FIG. 15 advantageously utilises Otto, diesel, rotary, true balanced rotary or gas turbine engines and is adapted to be used in front and/or rear wheel drive vehicles wherein drive shaft 47 is operably connected to a single conventional automotive differential gear assembly. Alternatively, the vehicle powertrain 47 illustrated in FIG. 15 may be mid-mounted in four wheel drive vehicles wherein the drive shaft 47 is operably connected to forward and rear conventional four wheel drive differential gear assemblies.

The microprocessing control unit 45 shown in FIG. 14 includes an input device for receiving command input from the vehicle driver and a plurality of input/output interface devices (not shown) for providing closed loop feedback control of the performance parameters of the vehicle powertrain. Preferably, the plurality of input/output interface devices (not shown) comprise a plurality of high-performance sensors for monitoring, analysing and transmitting data on the performance parameters of the powertrain. The performance parameters advantageously include the load on the engine 44, the rotational speeds of each of the two primary and secondary power output gears or sprockets 42, 4 the load on the power control unit including hydraulic pressure and r.p.m., the load on each of the two half-axles 18 and 19 and the rotational speeds of each of the two half-axles 18 and 19. Preferably, the performance parameters continuously controlled by the microprocessing control unit 45 further include performance parameters that are specific to the type or types of the power unit comprising the vehicle powertrain.

In use, the microprocessing control unit 45 advantageously provides closed loop feedback control to continuously monitor, analyse and synergistically adjust the performance parameters in response to command input from the driver. During starting of the engine 44, the microprocessing control unit 45 conveniently controls the disengaging safety clutch and or the angular alignment of the swash plate 35 shown in FIG. 12 so that the secondary power input drive line is at 2:1 ratio to the primary drive line ensuring the main transmission 11 output bevel gear 14 remains in a stationary dynamically locked position at start up or parked safety position.

That is, at start up the microprocessing control unit 45 only connects the respective power output shaft of the engine 44 to the first gear 20 of the control unit 21 when the ratio of rotational speeds between power output gear 42 arid 43 is 2:1.

From the foregoing description of the operation of the power transmission units 21 and 10 it will be appreciated that each of the differential side gears 16 and 17 of the power transmission unit 10 will thus be positively locked in a safe stationary position at zero speed. It will be apparent that in most applications a manually operated overriding clutch is provided to increase the level of safety. It will also be appreciated from the foregoing description of the operation of the power transmission units 21 and 10 that in response to subsequent command input, for example from a vehicle driver, the microprocessing control unit 45 will conveniently control the operation of the engine 44 and the power control unit 21 to adjust the relative speeds of the power output gears 23 and 30 so that the differential side gears 5 and 14 of the power transmission unit 10 and hence the two half-axles 18 and 19 and the two drive wheels (not shown), rotate in a desired direction, at a desired speed. During operation of the vehicle powertrain 21 and 10 the microprocessing control unit 45 adaptively responds to command input and/or analyses of data on the performance parameters and continuously controls the final output speed and power of the vehicle powertrain 48 to meet operational requirements by synergistically adjusting the performance parameters, including the relative speeds of the two primary and secondary power drive lines at A and B and the reactive load control between the two drive lines 23 and 30 at A and B.

Advantageously, the microprocessing control unit 45 is programmable with a performance algorithm so that it continuously synergistically adjusts the controlled performance parameters in accordance with the algorithm to optimise vehicle powertrain 48 performance. For example, the microprocessing control unit 45 may be programmed to optimise vehicle powertrain 48 efficiency, in which case in response to command input the microprocessing control unit 45 would continuously monitor, analyse and synergistically adjust the performance parameters of each of the primary and secondary power drive lines to maintain the efficiency of the engine 44 within peak ranges while simultaneously continuously monitoring and adjusting the load sharing between the primary and secondary drive line of the power control unit 21 to synergistically control the final output speed and power of the power transmission unit 10 to meet operational requirements. As such, overall engine efficiencies may be achieved over a wide range of different operating conditions It will thus be appreciated that in embodiments employing internal combustion engines, significant improvements in fuel economy and correspondingly significant reductions in exhaust gas emission may be achieved.

For example, where the power unit is an internal combustion piston engine (such as in the embodiment illustrated in FIG. 14), the performance parameters continuously controlled by the microprocessing control unit advantageously further include parameters that are specific to the internal combustion piston engine such as manifold boost pressure, engine torque, engine r.p.m., fuel mixture, spark timing, valve timing; variable intake manifold geometry, combustion chamber conditions, compression ratio and exhaust gas chemistry.

By having the function of a stepless variable speed transmission giving the precise vehicle speed required while maintaining the optimum fuel air burn rate, by varying the engine r.p.m. and the primary and secondary power output speeds of the power control unit 21 in relation to each other, and by varying the fuel air ratios, optimum operating conditions can be maintained in real time across the full spectrum of speed and energy requirements for vehicles, trucks, and tractors offering minimum pollution and maximum fuel efficiency.

In view of the above description, it will be appreciated that embodiments of the vehicle powertrain of the present invention provide a compact adaptively controlled vehicle powertrain that is particularly suited for weight and size critical applications, such as in small and medium size front-wheel drive vehicles.

Figure 16:
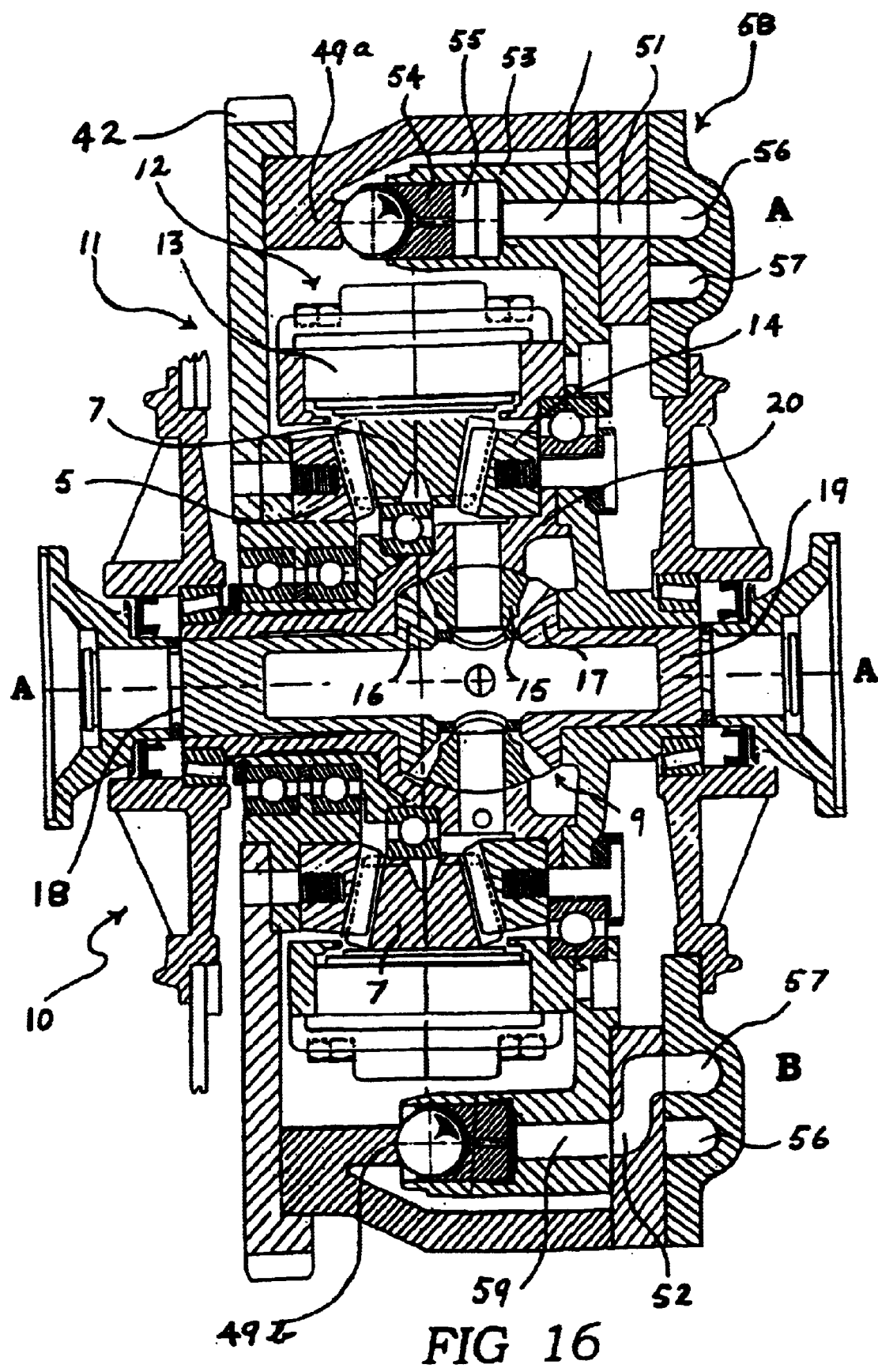
FIG. 16 is a cutaway view of a practical embodiment of the power transmission unit illustrated in FIG. 13 combining one embodiment of the differential displacement of he dynamic hydraulic/mechanical variable secondary power drive line and the primary rive line integral with the outer transmission and the inner differential.

FIG. 16 embodies the same principles described in FIG. 9 regarding the two input means of the main transmission 11 and the differential gear assembly 9 combining to form the power transmission unit 10. The speed variation required between the bevel gear 5 powered directly from the primary power input drive line and the annular pinion carrier 13 and develops and controls the same reactive forces as described in FIGS. 4, 5, 6 and 7.

FIG. 16 shows a compact unified combination of the power control unit invention and the power transmission unit 10 which by differential displacement controls both the speed variation and reactive forces explained above. A cam track 49(a) is fixed to the primary power input gear sprocket or pulley 42 and the annular cam track is fixed to a commutator plate 50 which has two kidney-shaped commutator slots 51 and 52 radiating almost 180° either side of the circular commutator plate with sufficient separation between the opposing semi-circular commutator slots to prevent the hydraulic oil from travelling from the high pressure side to the low pressure side which pressure will alternate pending forces described in FIGS. 4, 5, 6 and 7. Each of the commutator slots 51 and 52 shown in FIG. 16 is permanently fixed to be aligned with the camplate 49(a), 49(b) so that the highest part of the circular cam, track 49(b) is at the dividing point of the two commutator semi-circular slots 51 & 52. By this means regardless of the rotation of the primary input sprocket or gear to which the cam track 49(a), 49(b) is fixed the commutator valve plate 50 and the commutator slots 51 and 52 will also rotate with the cam track to ensure permanent alignment of the cam track and commutator plate for receiving and releasing hydraulic fluid as the piston rotating group 53 rotates differentially by this means if hydraulic fluid or oil is entrapped behind the piston 54 in cylinder 55. The reactive force against the cam track 49(a), 49(b) will cause the piston rotating group to rotate in unison with the primary power input gear or sprocket 42. The piston rotating group is attached to the annular pinion carrier 13 which rotatably supports an internally arranged epicycle bevel pinion gears 7 causing output speed variation and torque forces which will be restrained by the rotating piston group 53 in a manner as previously described.

For control of the two semi-circular commutator slots which may be either a slot or a series of circular holes in a curved path which may also be interlinked with a narrow central slot, it is necessary to separate the high pressure commutator slot from the low pressure side and as the commutator slots 51 & 52 will also be differentially rotating, it is necessary to have a stationary commutator gallery 56 at port A and galley 57 at port B offset from each other relative to axis AA. By this means although rotating differentially the piston rotating group cylinder oil galleries 51 & 52 via the commutator plate slots 51 & 52 will always be adjacent their respective high and low pressure ports.

The advantages of the invention as described in FIG. 16 is that the control of the required variation of power input speeds differentially between the primary and secondary power input drive lines and the control of the interactive forces is accomplished in a compact integrated unit suitable for replacement of the differential in the current locations of all vehicles, trucks and tractors or any such machinery normally requiring forward and reverse, variable speeds and differential action and further allows the deletion of the gear box.

The complete integrated unit as described in FIG. 16 is a differential reactive hydraulic/mechanical power transmission 58 shown in this embodiment the reactive mechanism for controlling the forces in the secondary power input drive line is a piston fitted with a ball running on a circular concave cam track. It is intended to also use other embodiments using pistons which may be fitted with piston rings and rollers attached to the end of the pistons by means of a bearing and shaft which the roller can freely rotate about the rollers and will engage against a suitably profiled cam track. This assembly may also be fitted with side rollers to prevent high torque forces being transferred to the pistons. One embodiment is shown later in FIG. 23 and a further embodiment in FIG. 24, The invention as described in FIG. 16 covers an outer hydraulic controlled differential power control unit, with a mid main power transmission unit 11 and an inner drive differential 9.

It will further be appreciated that the differential carrier in vehicular application normally rotates at approximately a 4:1 ratio to the engine r.p.m. For that reason the invention of a unitized differential reactive hydraulic/mechanical power transmission 58 will at full speed engine r.p.m. of say 4,000 r.p.m. only be rotating at 1,000 r.p.m. for long life and durability of all components.

By placing the rotating piston group 53 at the outer circumference it ensures high torque at low speed and also ensures the width between the half axles 18, 19 is held to a minimum for mounting between the front wheels in a front wheel drive vehicle or without the half axles in the normal space and normal axles for a replacement for the standard differential in vehicles, trucks and tractors which then includes a stepless reactive transmission integrated with a microprocessor controller as described.

Figure 17:
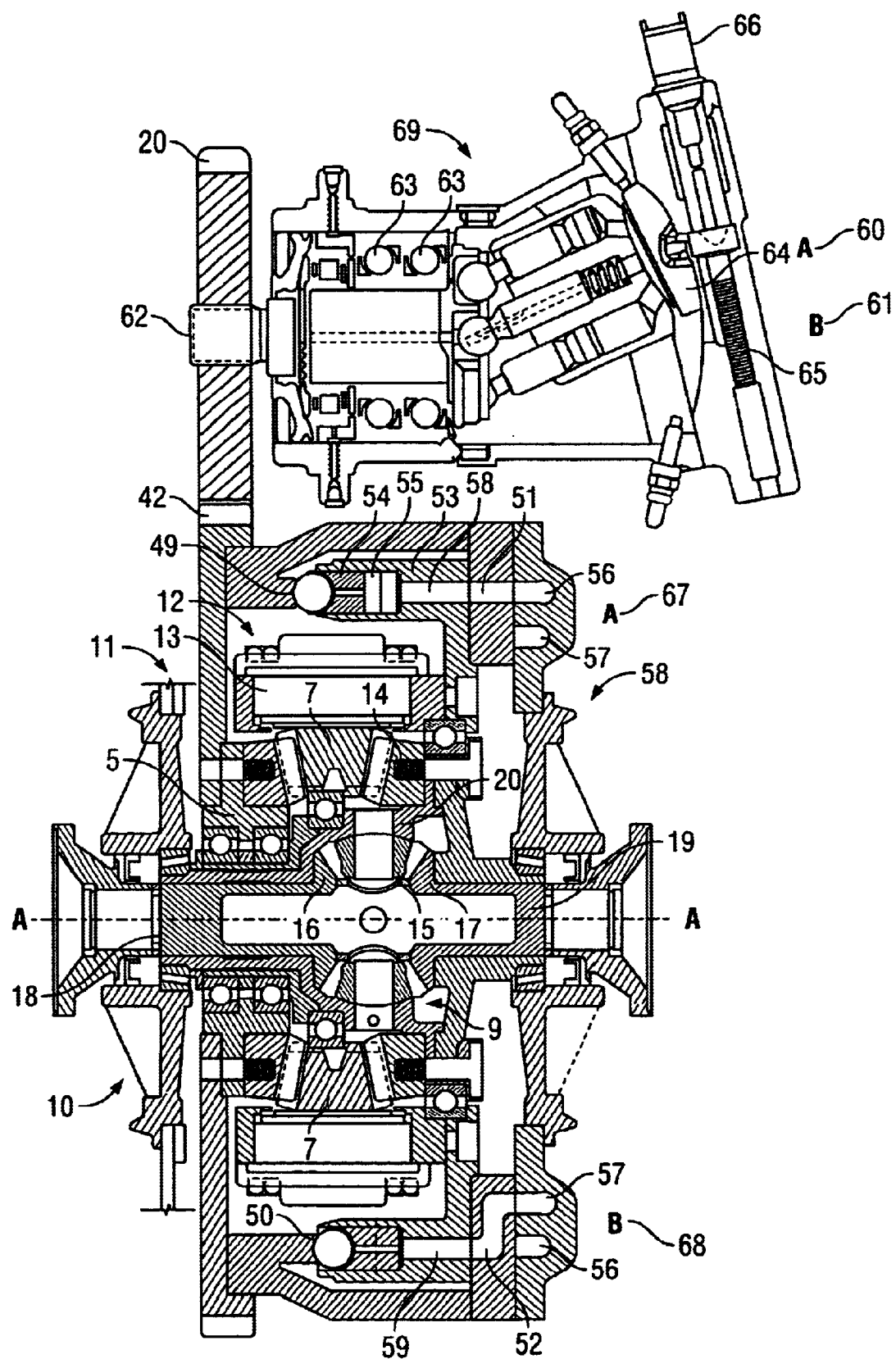
FIG. 17 is a partially-sectioned diagrammatic view of an embodiment of a power transmission illustrated in FIG. 16 with an integral primary and secondary drive line.

In FIG. 16 the speed and reactive forces have been described culminating in the control being affected by the hydraulic fluid pressure and flow rate at port A 56 and port B 57. In FIG. 17 the primary power input from the power unit is engaged with a sprocket or gear 20 which in turn is engaged with a sprocket or gear 42 gear 20 is attached to a shaft 62 which is supported by bearings 63 which in turn drives a bent axis variable displacement pump 69 which in turn delivers and receives hydraulic fluid via port A 60 and port B 61.

The lens 64 of the bent axis variable displacement pump is controlled from zero to maximum flow via the rotation of the control screw 65 which in turn is controlled continually by motor 66 which is moved via command from the microprocessing control unit shown in FIG. 14. With the ports 60, 61 of the bent axis variable displacement axial piston pump appropriately interconnected with the ports 67, 68 in the unitized differential reactive hydraulic/mechanical power transmission 58 control of the reactive forces and speed of the piston rotating group 53 can be effected as previously described.

The invention as described in FIG. 17 may also be used with the bent axis axial piston variable displacement pump unit 69 operably connected to a similar arrangement of a cam track 49 fixed to a commutator plate 51 and supported to rotate about a shaft on the axis A—A with the piston group 53 being able to differentially rotate relative to the cam plate 49 and it's supporting members which will also rotate around axis A—A with the unit 58 connected to the bent axis pump assembly 69 via the offset ports as described above but both units as a separate entity from the power transmission unit 10 operably connected to the power transmission unit 10 in the same manner as that described in FIG. 13. It is also a further embodiment of the invention to have the rotating piston group when used in the manner described above in the form of axial or radial pistons acting against cam plates so positions to give the same effect as described and with flat sided rollers with axles curved sided rollers with axles or balls or rollers with or without axles (one such embodiment is shown later in FIGS. 23, 24) acting against the matching closed cam track in either an axial or radial position.

Figure 18:
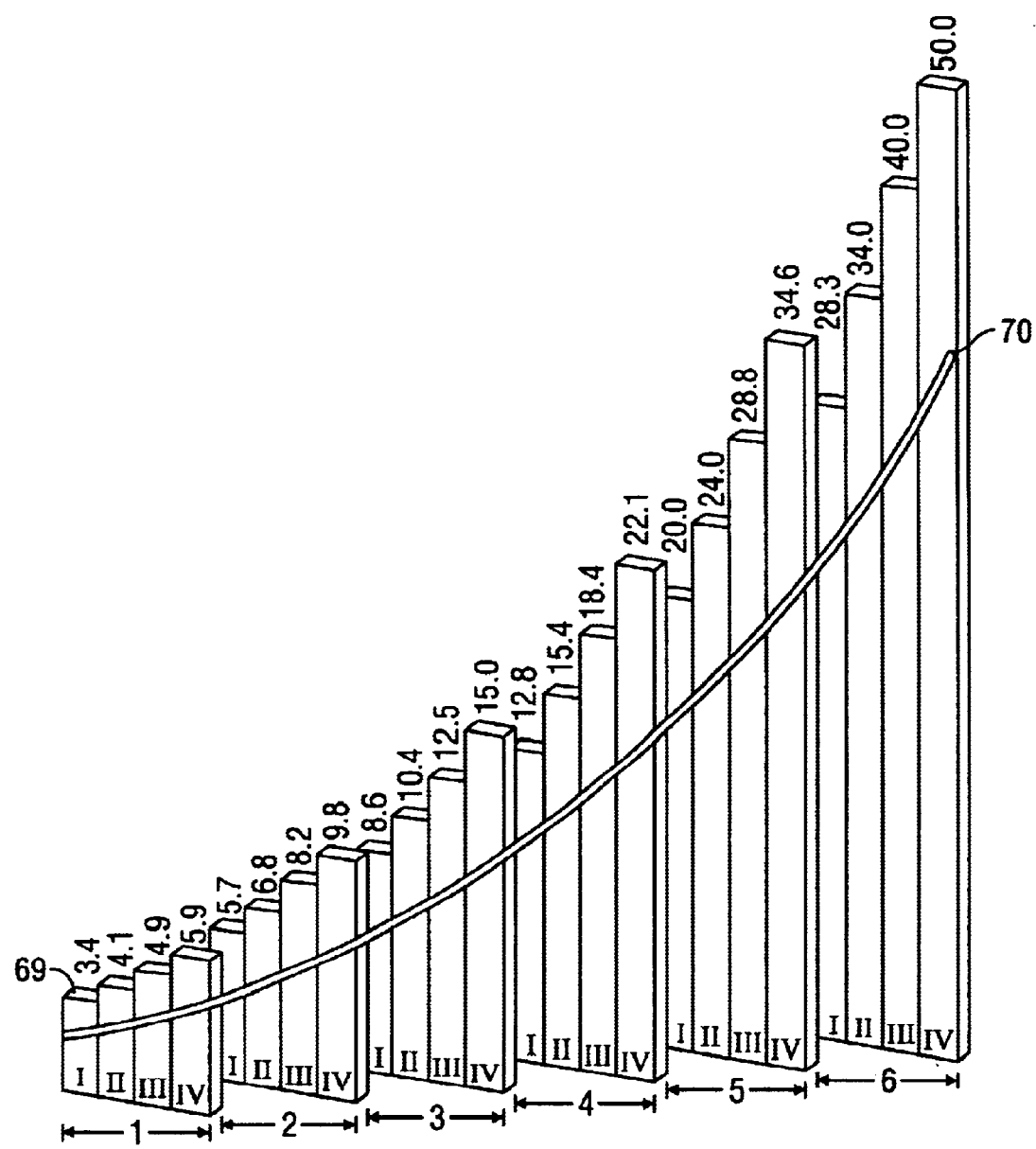
FIG. 18 is a graph of forward speed against selected gear for a 24 gear transmission the prior art.

The invention is suited in various embodiments for all types of vehicles, trucks and tractors. In the case of tractors and trucks to understand the requirements and the application of the invention to tractors and trucks both of which require exceptional torque and are,subject to extremes of external highly variable energy demands. It is useful to explore the currently available and most advanced technology and methods to meet the high loads and extreme variability of torque requirements to better understand the function and the application of the invention in tractors, trucks and other modes of heavy-duty transport and machines FIG. 18 shows a graph of a 24 gear transmission starting at gear one shown at 69 giving a forward speed of 3.4 km/hr and progressing through steps which in each gear takes the engine through repeated cycles for each gear, each cycle starts with the engine at low revolutions per minute (r.p.m.) and high torque load requirement which while the engine is at low r.p.m. it is also at a point of producing low power and as a result high fuel consumption and low efficiency in conversion of the fuel air mixture to power, As the engine r.p.m. increases the power output increases until the engine r.p.m. and torque are balanced. At this point generally in the mid range of each of the gears, the fuel consumption is at the most efficient point. As the engine continues to increase in r.p.m. in a particular gear, the fuel consumption increases and the efficiency of conversion of fuel to power diminishes. In FIG. 18 this cycle is repeated as represented by the graph through 24 gears and engine cycles as described above. The curve 70 represents the desired mean gear ratio as being variable allowing the engine to run constantly balanced between engine r.p.m. and torque load at which point fuel consumption is lowest and the engine efficiency is converting the fuel to power at its highest. It is the object of the invention to allow the engine to at all time run in this balanced condition maximum efficiency.

Figure 19:
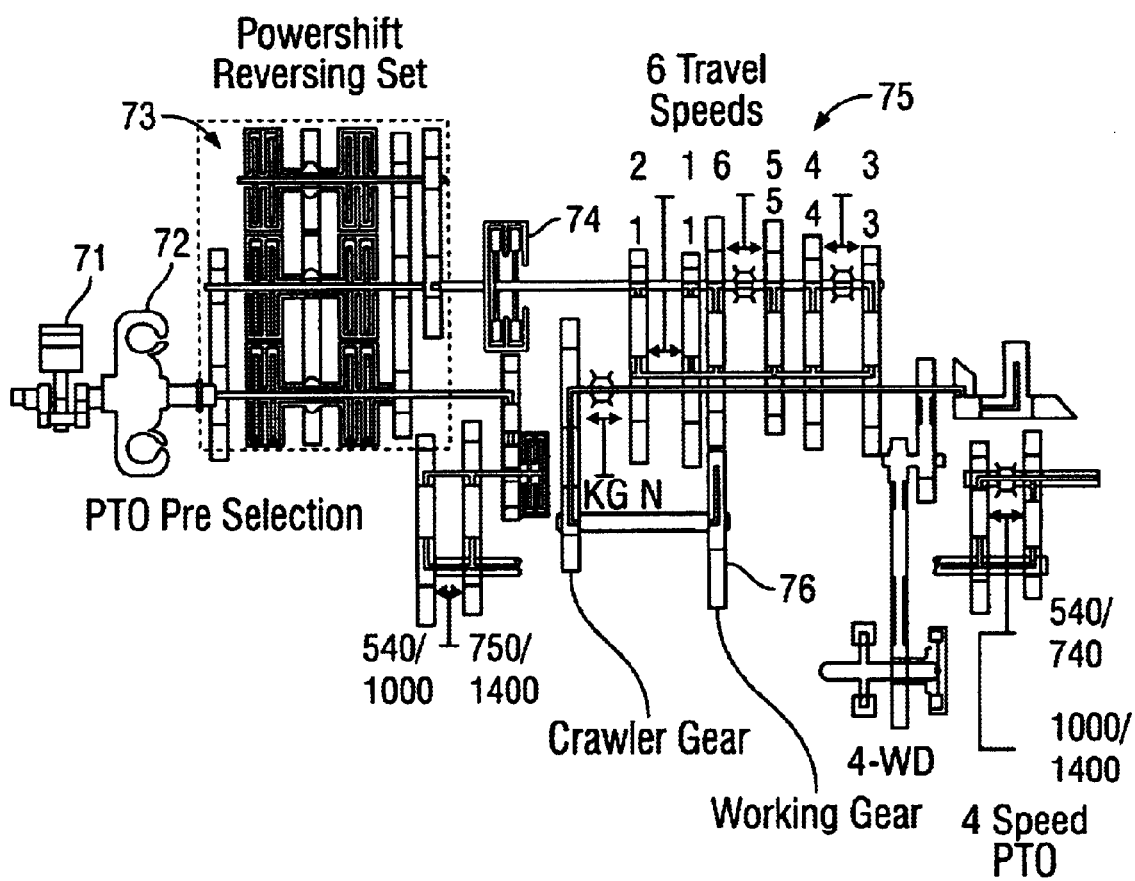
FIG. 19 is a diagram of a prior art powertrain required to achieve the 24 gear ratios shown in FIG. 18.

FIG. 19 is a diagram of the complex powertrain required to achieve the 24 gear steps shown in FIG. 18.

The power train diagram in FIG. 19 commences at the engine 71, The engine torque and horsepower (power) is transferred through a torque converter 72 to assist in smoothing out the shock loads generated when gears are changed and clutches either manual or automatic are engaged and also the torque converter is particularly used at low speed, high load start point. The efficiency aspect of the torque converter energy transfer is a further cause for power loss through slippage of energy dissipating as heat, For a tractor as shown in FIG. 19, aside from 24 forward gears it requires a powershift reversing set 73, a driving clutch 74, six travel gears 75 and a crawler gear/working gear 76.

Figure 20:
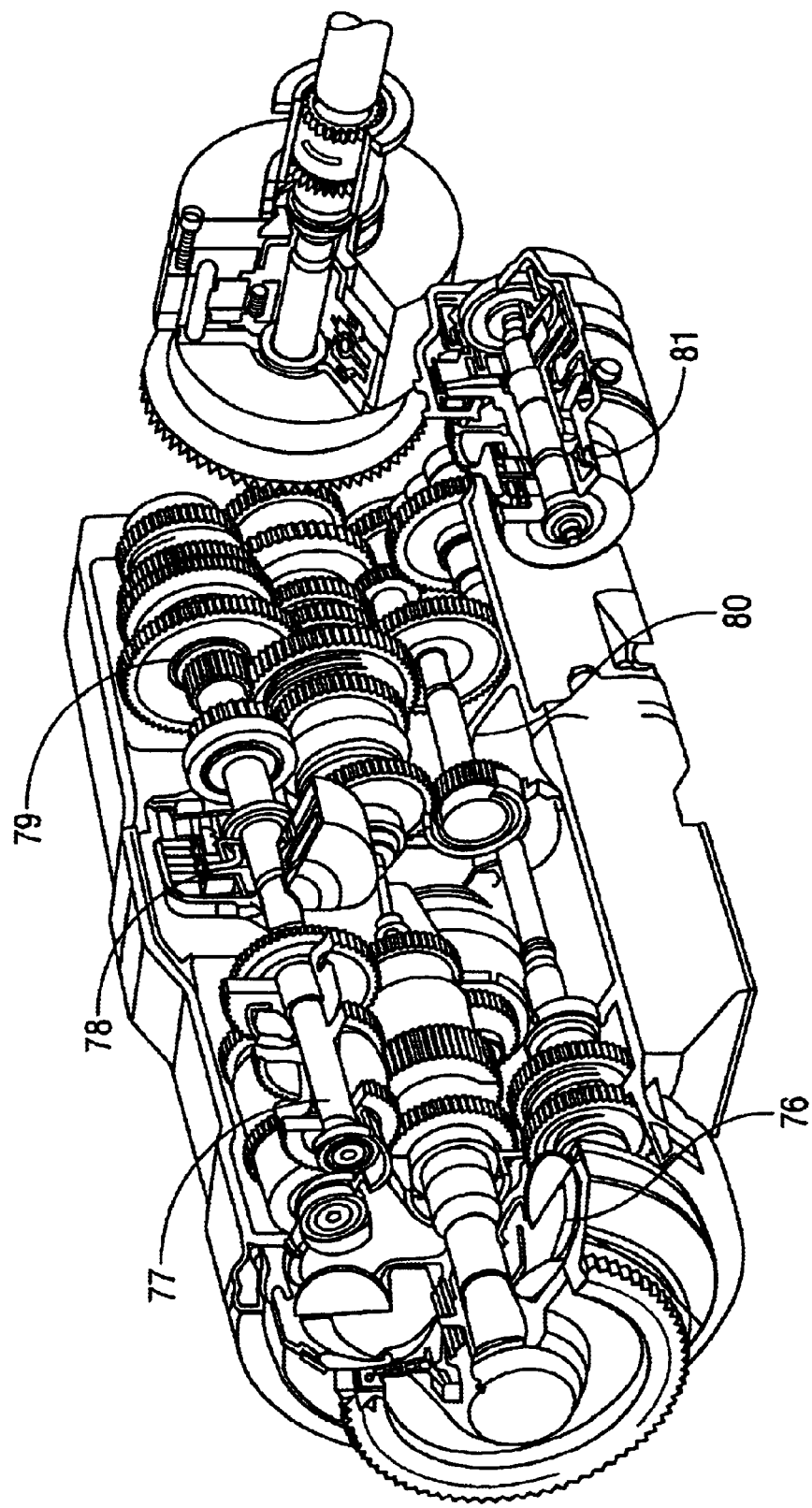
FIG. 20 is a cutaway of a 24 gear transmission of the kind shown in FIG. 19.

FIG. 20 is a cutaway illustration of a 24 gear transmission showing the complexity and high cost of achieving a transmission which has 24 steps or gear ratios to smooth out the power curve to an acceptable level. It is the object of the invention to achieve a stepless change of gearing ratios using minimum working parts and at a lower capital cost while increasing the efficiency of the power train and reducing shock loadings and eliminating lugging or overspeeding of the engine as well as improving fuel economy and reducing pollution.

FIG. 20 shows the turbo clutch/torque converter 76, the powershift reversing set 77, drive clutch 78, six travel gears 79, crawler gears/working gears 80, tour wheel drive output to front axle 81.

Figure 21:
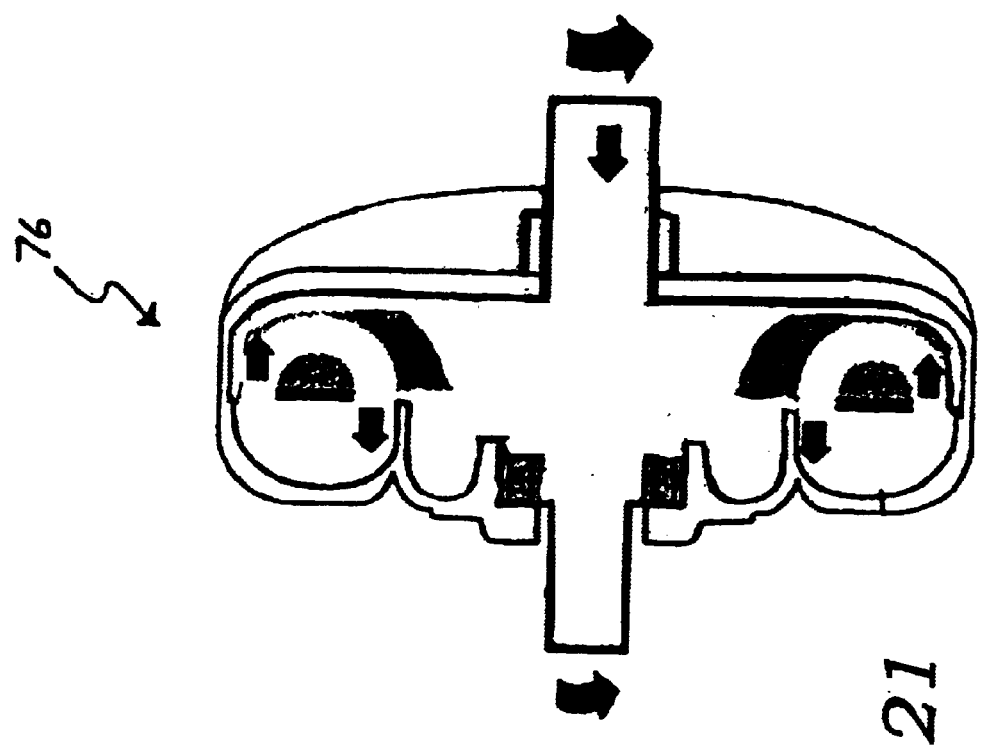
FIG. 21 is a cutaway view of a torque converter of the kind used in the transmission of FIG. 20.

FIG. 21 is a cutaway illustration of turboclutch/torque converter 76.

Figure 22:
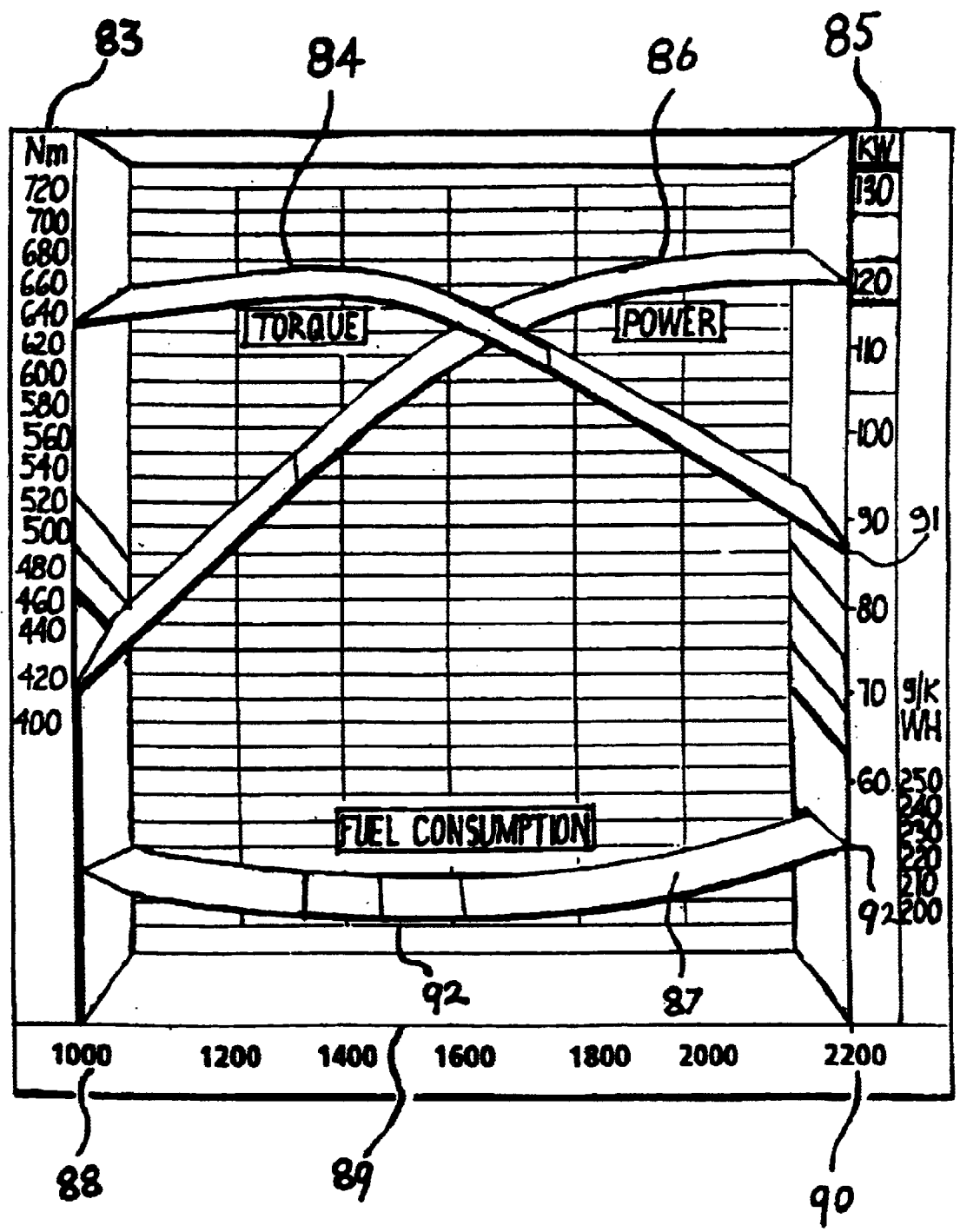
FIG. 22 is a graph showing the variation of fuel consumption torque and power against engine revolutions for a typical diesel engine.

FIG. 22 is a graph of the effect on an engine of the balance of r.p.m. and torque in terms of fuel efficiency. The base line 82 shows the actual r.p.m. range of a diesel engine as used in a tractor application, The torque level is shown in terms of Newton meters 83 and a graph of the toque is shown at 84. Power is shown in terms of kilowatts at 85 and represented by a power curve at 86. The effects of the r.p.m. and torque of the engine on fuel consumption can be seen as a consumption curve on the graph at 87. It will be noted that with the engine at low r.p.m. of 1,000 r.p.m. at 88 and high torque of 640 Newton metre, the fuel burn is 215 g/kwn. When the engine r.p.m. is between 1,400 r.p.m. and 1,600 r.p.m. at 89 and the torque is at 650 Newton meters, the fuel usage is at its lowest point of 195 g/kwn at 92, as the engine r.p.m. increases to 2,200 r.p.m. at 90 and the torque is reduced to 85 Newton metres at 91. The fuel consumption increases to 225 g/kwn at 92.

It can be seen that the object of the invention is to run the engine at all times regardless of highly variable loads and power demands in the peak efficiency zone which is the balanced point of r.p.m. and torque for that particular engine as shown on the graph as 1,450 r.p.m. and 640 Newton metres of torque with a fuel burn of 195 g/kwn.

The graph in FIG. 22 is used as an illustration only as the invention provides for a balance of engine r.p.m. and torque at a highly variable r.p.m. and torque range optimally selected and reactively continually changed by inputs and controlling outputs from the microprocessing control unit as shown in FIG. 14 as previously described.

Figure 23:
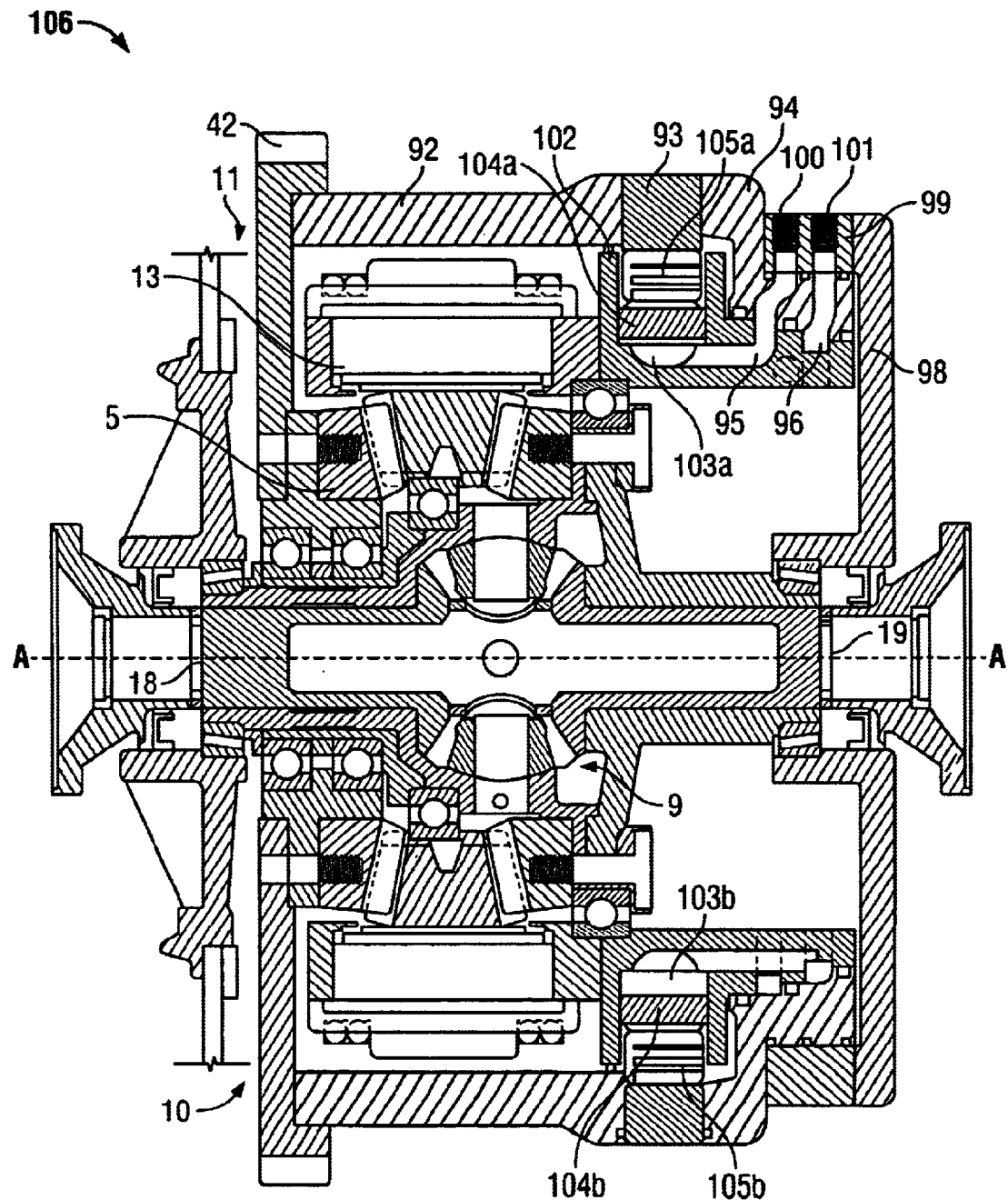
FIG. 23 shows an embodiment of the powertrain of this invention suited to high torque loads.

FIG. 23 is an embodiment of the invention suited for high torque high loads in vehicles and in particular heavy haulage by trucks and high torque work loads in forward and reverse in tractors.

The main transmission 11 although sized accordingly for the high load and torque demands embodies the same principles described in FIG. 9 regarding the two input means of the main transmission 11 and the differential gear assembly 9 combining to form the power transmission unit 10. The speed variation required between the bevel gear 5 powered mechanically from the primary power input drive line and the annular pinion carrier 13 and develops and controls the same reactive forces as described in FIGS. 4, 5, 6 and 7.

FIG. 23 shows a compact unified combination of the hydraulic/mechanical differential power control unit as part of the invention unified with the power transmission 10 which similarly to the description in FIG. 16, controls speed variation and reactive forces as previously explained.

Figure 25:
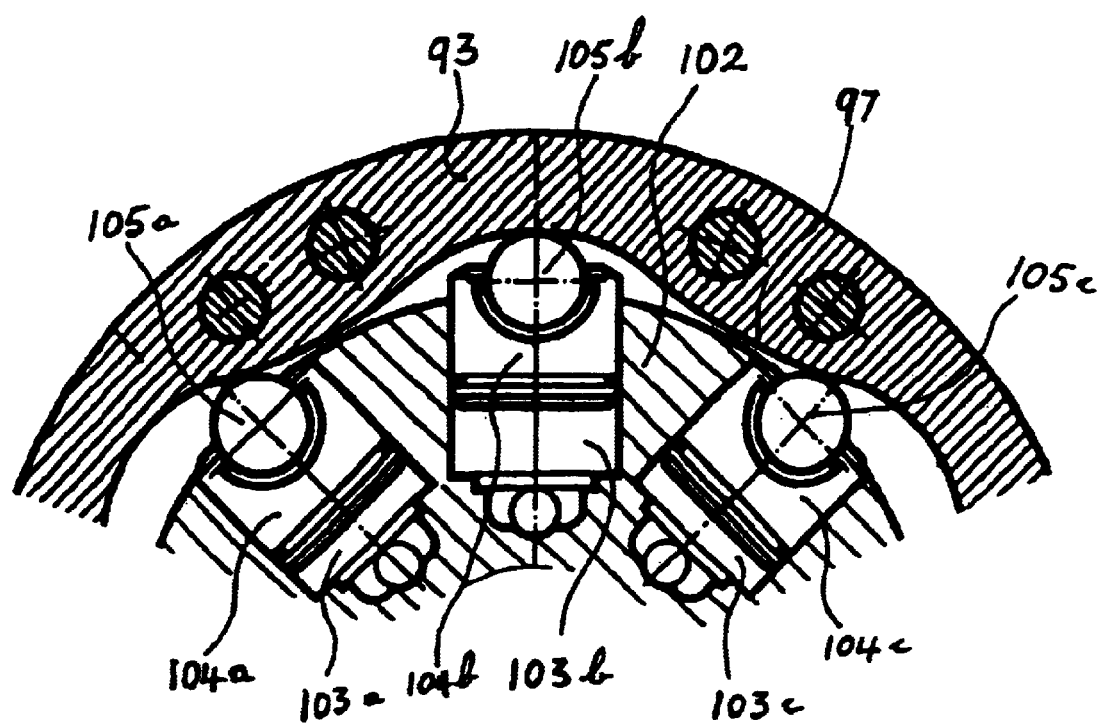
FIG. 25 shows the operational part of the arrangement shown, in FIGS. 23 and 24.

FIG. 23 particularly explains the compact nature and high torque characteristics of this embodiment of the invention, The primary power input drive line 42 is attached to an annular support member 92 which in turn support and is fixed to an annular internally convoluted cam 93, An end view of a section of the cam track and axial piston assembly is shown in FIG. 25. In FIG. 23 the cam 93 is fixed to a ported valve body 94 which rotates in unison with the cam 93 thus ensuring that regardless of the position of rotation the hydraulic fluid galleries 95 and 96 correctly align and supply high pressure and return flow of oil and the proper position relative to the cam holes 97 shown in FIG. 25.

The stationary housing 98 in FIG. 23 is attached to the non-rotating portion of the valve body 99 parts 100 and 101 are interconnected to the appropriate separate internal galleries to communicate with the rotating piston group 102 so that high pressure and return oil is transferred into cylinder chambers 103(*a*) and 103(*b*) at the proper time to extend the pistons 104(*a*) and 104(*b*) and engage rollers 105(*a*) and 105(*b*) to engage on the appropriate position on the cam track to connect the linear thrust of the pistons 104(*a*), 104(*b*) into rotary motion and/or to act as a restraining unit to control the speed of rotation of the annular pinion carrier 13 in relationship to bevel gear 5. This is achieved by galleries 95 and 96 being linearly and radially separated including the linear galleries communicating with the respective cylinder chambers 103(*a*), 103(*b*) and the other cylinders radially disposed and uniformly in the rotatable piston group, a section of which shown in FIG. 25.

The action of the rotating piston group 102 which is attached directly to the annular pinion carrier 13 which rotatably supports the internally arranged epicycle bevel pinion gears 7 causing output speed variation and torque forces which will be restrained by the rotating piston group 102 reacting against the cam track 93 in a hydraulic differential manner as previously described.

In FIG. 23 the hydraulic differential speed control is by means of axial piston rollers 105(*a*), 105(*b*) reacting against the cam track 93 at the outer circumference of the power transmission power train assembly 106 for maximum efficiency and maximum torque application.

The dynamic hydraulic differential power control is situated to one side of the annular pinion carrier 13 to form a compact integrated and unified assembly with the power transmission unit 10.

Figure 26:
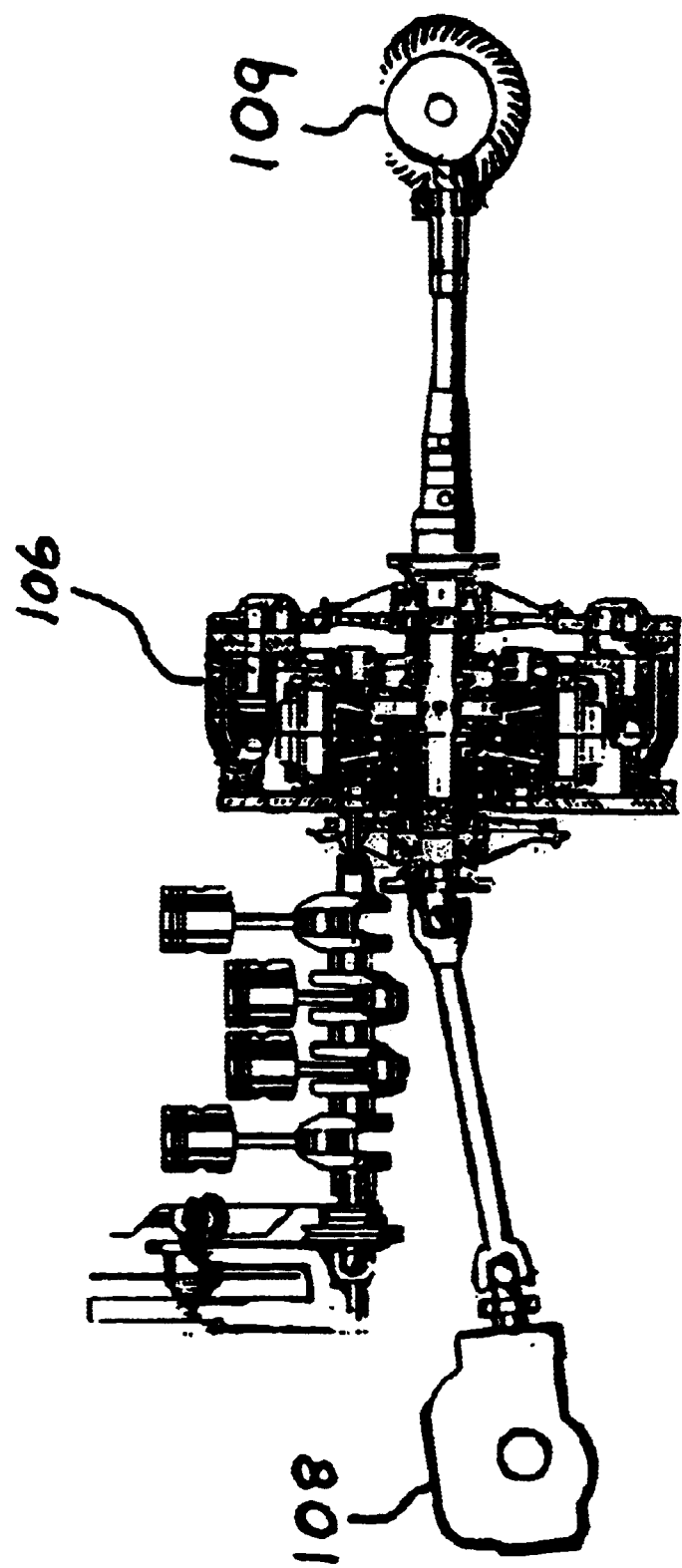
FIG. 26 shows a cutaway illustration of a four wheel drive tractor incorporating a powertrain according to an embodiment of this invention.
Figure 26A:
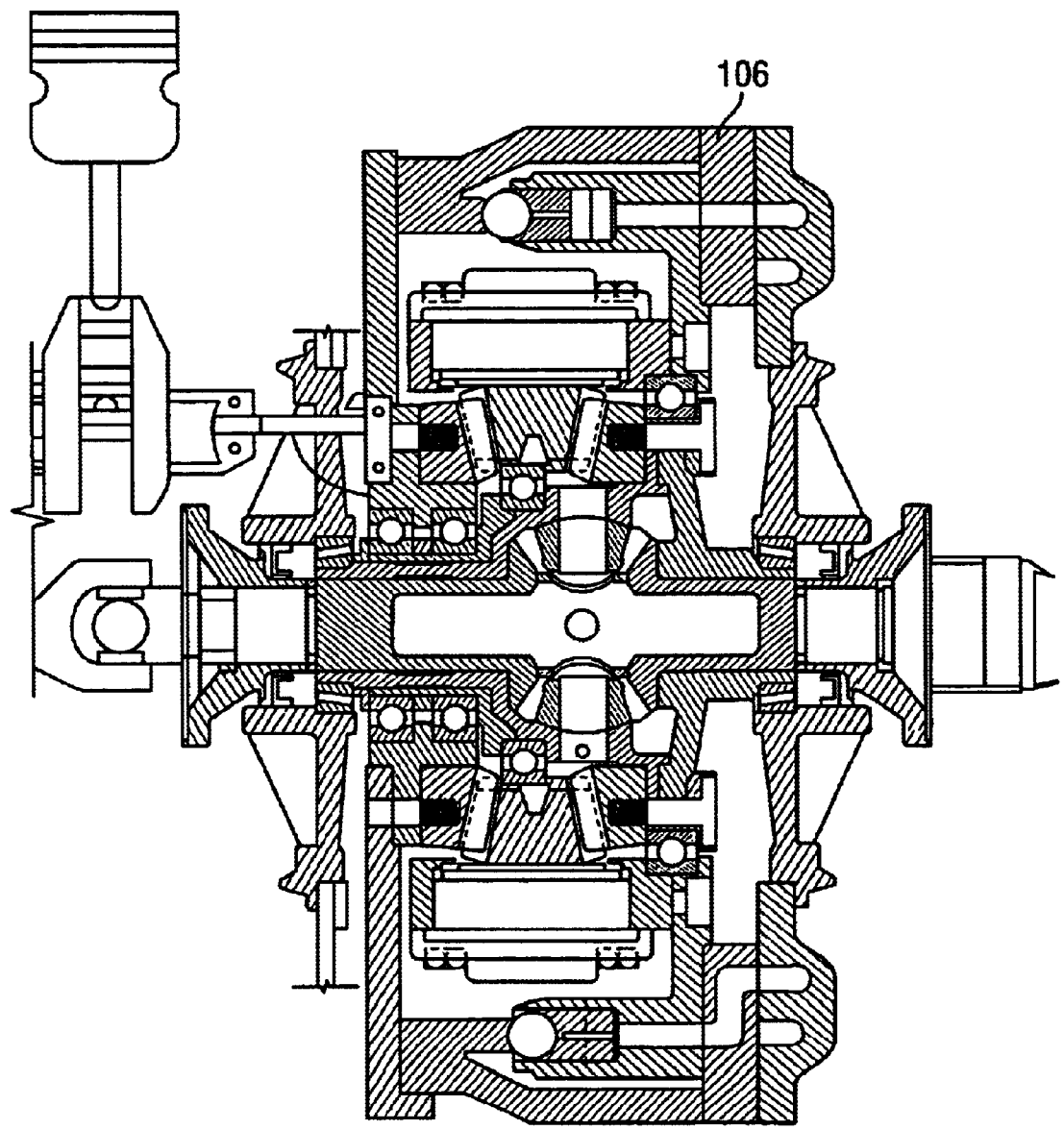

FIG. 23 shows the invention in a compact high torque and efficient form suitable for all applications previously described but in particular for the direct replacement of vehicle, truck and tractor differentials to act as both an infinitely variable stepless transmission from reverse through to overdrive while also providing differential energy to both axles 18 and 19. In one embodiment (not shown) the differential 9 may be of a limited slip or controllable differential lock assembly. The invention as described in FIG. 23 maybe advantageously positioned mid point in a four wheel drive tractor with half axles 18 and 19 being connected to universals and propeller shafts to the front and rear differentials and axles assemblies of a four wheel drive vehicle or tractor as shown in FIG. 26.

Figure 24:
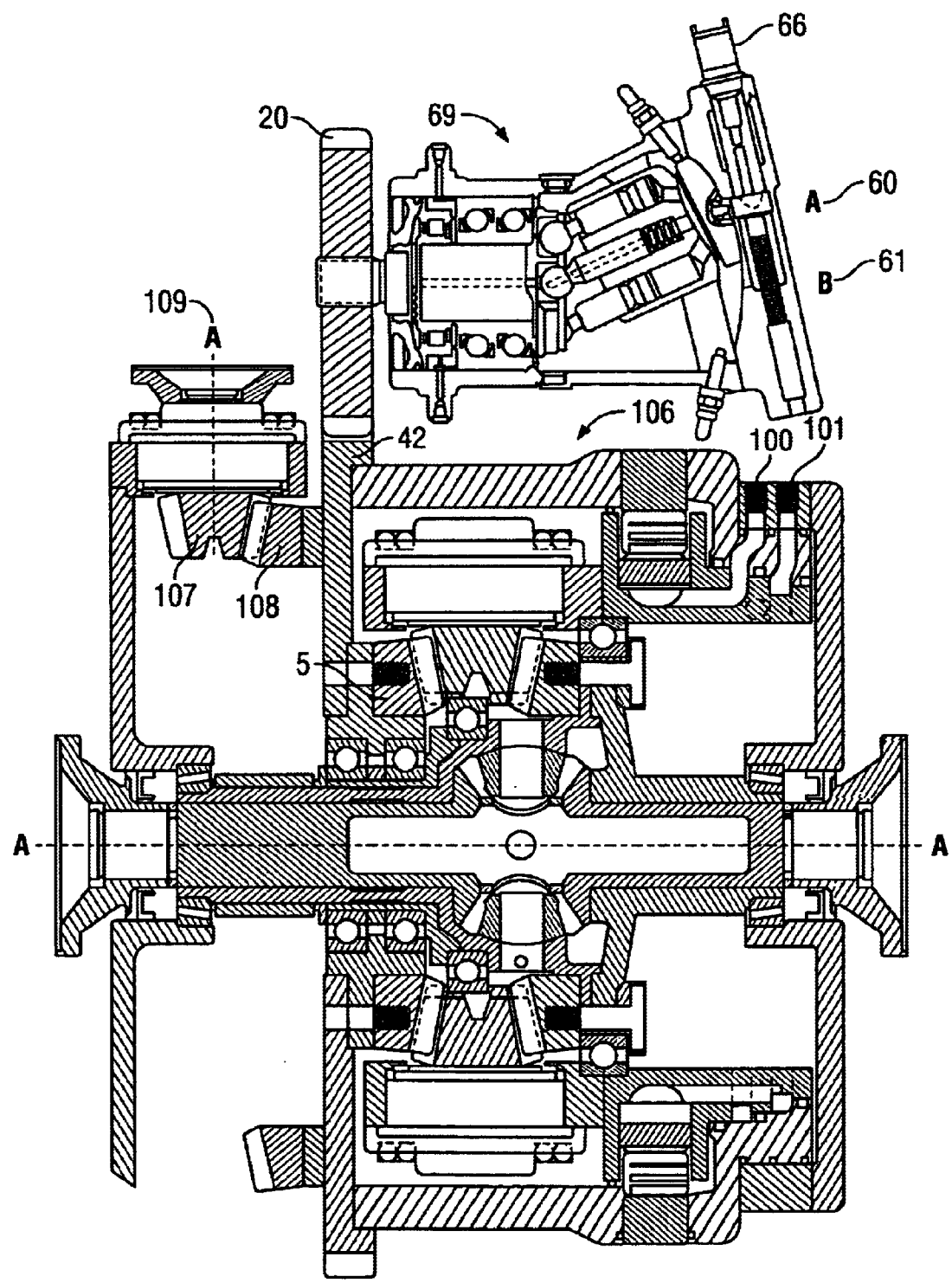
FIG. 24 shows the application of an embodiment of the invention shown in FIG. 23.

FIG. 24 is an embodiment of the invention described in FIG. 23 with the primary mechanical drive line being transmitted through pinion 107 and bevel gear 108 to the bevel gear 5 and also via the gear and sprocket 42 to gear or sprocket 20 which in turn is attached to the bent axis variable displacement pump 69 which in turn delivers and receives hydraulic fluid via ports 60 and 61 which are appropriately connected with ports 60 and 61 which are appropriately connected with ports 100 and 101 in the unitized differential reactive hydraulic/mechanical power transmission 106 as described in FIG. 23. The invention as described in FIG. 24 is particularly suited for replacement of the transmission and differential and being situated in the normal position of the differential in vehicles and particularly trucks and tractors, being self-contained and only requiring a high-speed tail shaft to input at A which is connected to pinion 107 and the other external input being the control by input from the microprocessing control unit 45 as described in FIG. 14 on the motor energised lead screw 66 as described in FIG. 17.

As previously described all differential hydraulic/mechanical power control units described in all figures in relationship to this invention will be subjected to reversal, of reactive forces and will, where appropriate, be fitted with check to enable the induction of hydraulic fluid on the low pressure side of the hydraulic circuit to prevent cavitation. When energy reversal occurs the check valves on both sides of the circuit may be integral with pressure relief valves and/or a charge pump to provide low pressure hydraulic fluid to the alternating low pressure sides of the circuit as required.

FIG. 25 functions as previously described in FIG. 23, In FIG. 25 the segment of cam track 93 is viewed from the end showing the rotating piston group 102, cylinder chambers 103(*a*), 103(*b*) and 103(*c*), pistons 104(*a*), 104(*b*) and 104(*c*), rollers 105(*a*), 105(*b*) and 105(*c*). The cam track 93 has an opposing wave form track that is symmetrical and therefore remains balanced. The pistons 104(*a*), 104(*b*), 104(*c*) and the other pistons are radially disposed and activated to remain balanced on rotation. The radial disposition of the cylinders and pistons in the radial piston rotating group 102 are so positioned relative to the wave form of the cam track 93 that while the pistons 104(*c*) and roller 105(*c*) are in a position of transferring energy either to or from the wave form of the cam track 93 roller 105(*b*) and piston 104(*b*) have completed the cycle and the cylinder chamber 103(*b*) is at maximum displacement. This action is uniformly occupying in a staged manner over the plurality of pistons and wave forms about the complete circumference of the assembly for smooth transfer from rotary to reciprocating rods of oil being progressively transferred and controlled by the bent axis variable displacement axial piston pump 69 shown in FIG. 24.

FIG. 26 shows a cutaway illustration of a four wheel drive tractor with one embodiment of the invention 106 as described in FIG. 17 which is advantageously mounted to provide differential power to the front and rear axle 108 and 109.

Figure 27:
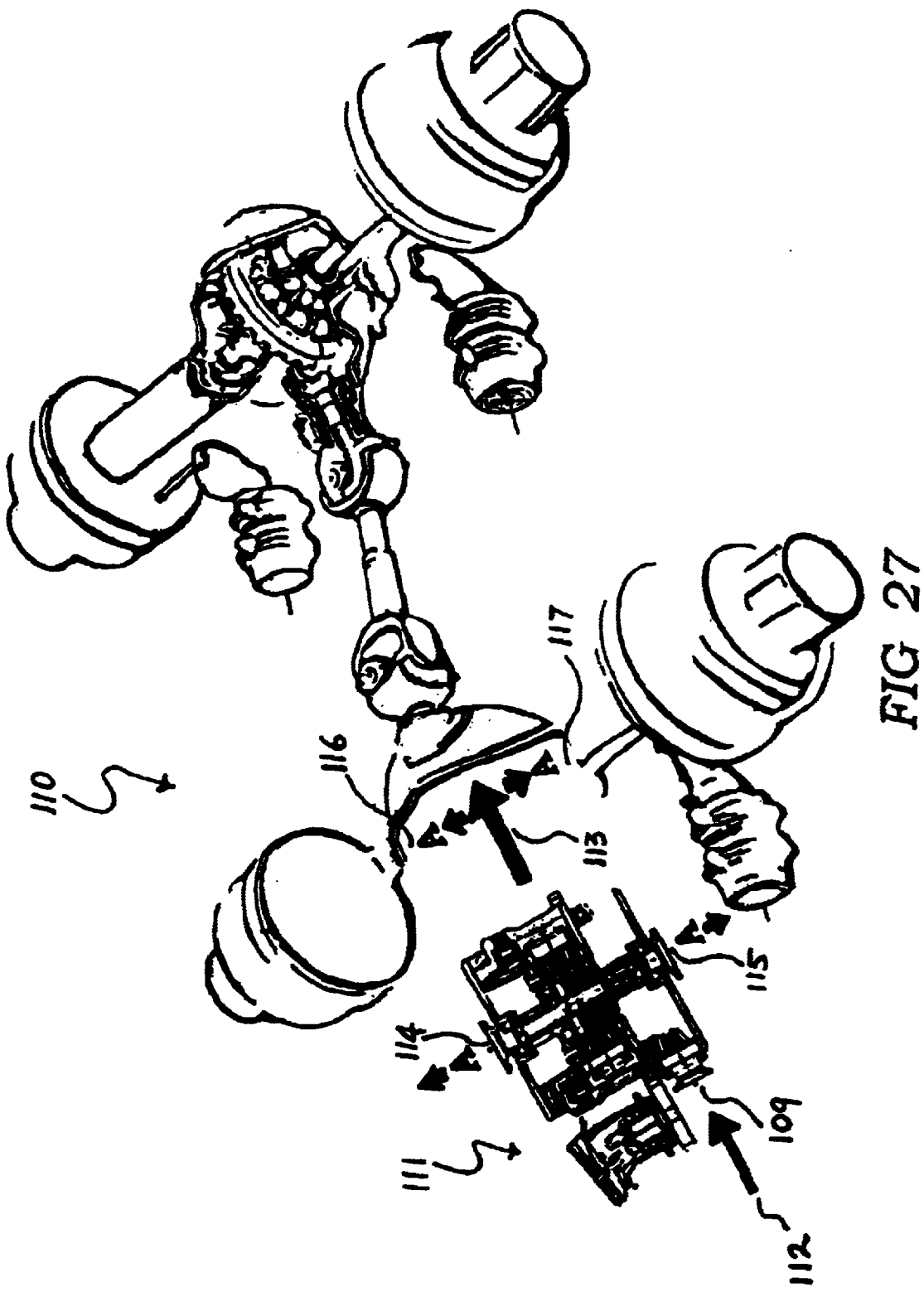
FIG. 27 shows a cutaway illustration of a tandem drive assembly incorporating a powertrain according to the present invention.

FIG. 27 shows a cutaway illustration of a tandem drive assembly 110 with the main transmission/gearbox and primary drive differential being replaced with one embodiment of the invention 111 as described in FIGS. 23 and 24.

The mechanical propeller shaft from the inline engine would provide power and connect at 109, the engine mechanical input power being in the direction of arrow 112. With the transmission assembly installed in the differential housing as signified by arrow 113, the transmission differential full axles would connect at 114 and 115 and when in position would provide power output to both axles at 116 and 117. It will be appreciated that the integrated power unit 111 can be used in tandem and/or single axle machines as described in FIG. 27.

Figure 27A:
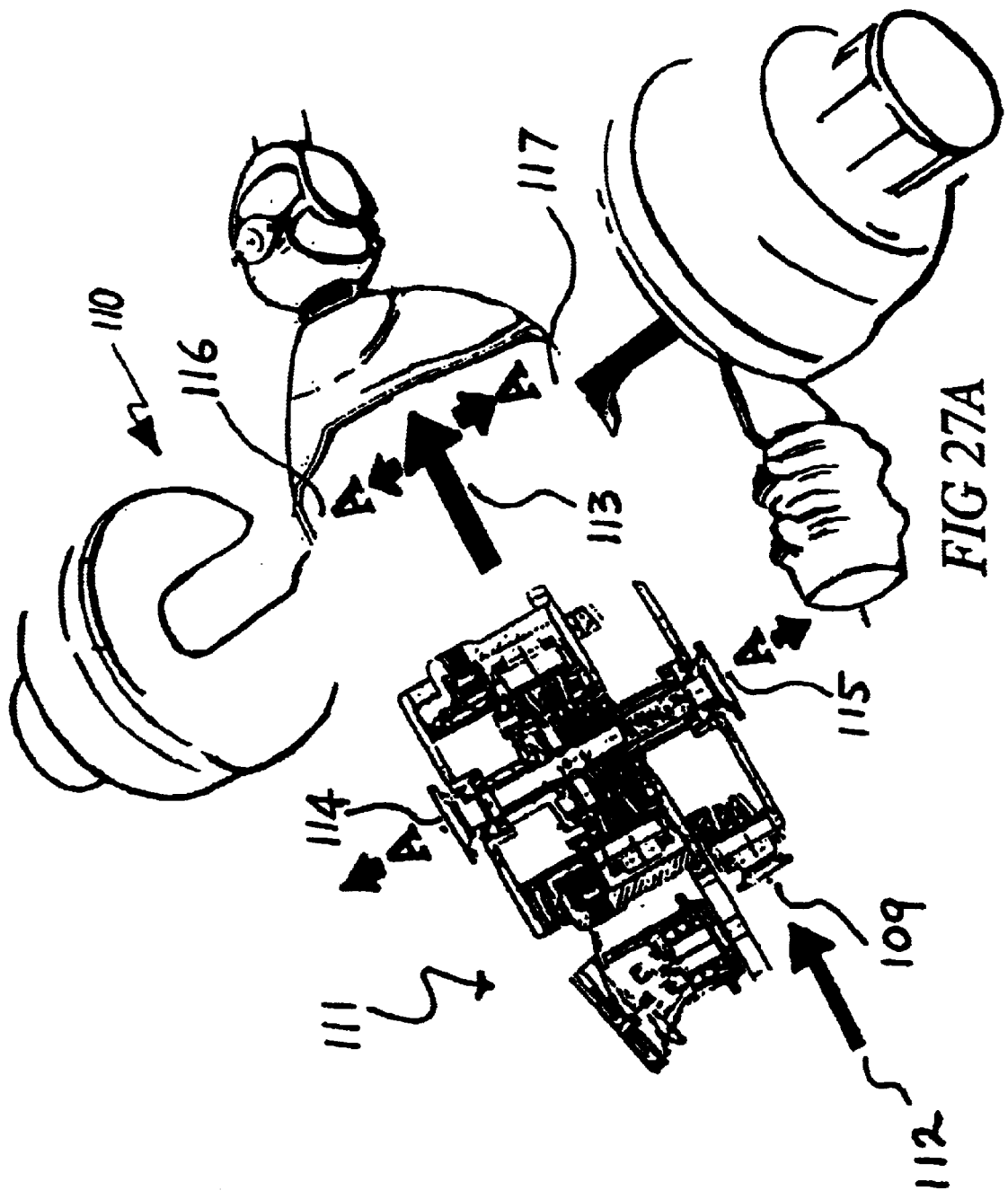
FIG. 27A shows a further embodiment of the powertrain according to this invention.

FIG. 27A shows an embodiment of the invention where the outer main transmission 11 as described in FIG. 9 may have the differential gear assembly 9 mounted to one side of the outer main transmission 11 with the annular pinion carriers 13 which rotatably supports externally arranged epicyclic bevel pinion gears 7. By this means a very high torque power transmission unit 10 can be provided with reduced external diameter allowing maximum diameter of the main transmission 11 including the first bevel gear 5 and the epicyclic assembly 12 coaxially arranged to rotate about a first axis A—A. The epicyclic gear assembly 12 is mounted internally and is supported on an internal annular pinion carrier 13. Spindles 4 radiate out from and are fixed to the hollow annular pinion carrier 13. The spindles 4 support the bevel pinion gears 7 which are free to rotate about the spindles 4 by means of bearings 8. The external ends of the spindles 4 are attached to a gear or sprocket 43. The, function of the transmission unit 10 is described in FIG. 8, 9 with the primary drive line shown in FIG. 27A as A, the secondary variable drive line at 43 shown as B and the power output via the second bevel gear 6 shown as C which in turn is directly fixed to the differential carrier 20 at D.

This allows the output drive via the second bevel gear 6 of the main transmission 11 to be transferred to one side of the main transmission 11 to a large diameter differential gear assembly 9 which being mounted to one side can be equal in diameter to the bevel gears 5, 6 to allow normal differential transmission of power at very high torque.

The normal differential function delivers power via side gear 17 to axle 19 and via side gear 16 through the hollow bevel gear 6, carrier assembly 118 and bevel gear 5 by means of axle 18.

It will be appreciated to the differential can be positioned on the left or right and the principle may be incorporated in the various embodiments as shown and described in FIGS. 9, 12, 13, 14, 15, 16, 17, 23, 24, 26. The invention described in FIG. 27A is particularly suited for application in the embodiments described in FIGS. 24 and 27 in particular for the direct replacement of a standard differential thereby providing both the function of gearbox and differential in a confined radial space allowing reduced diameter for ground clearance when used in extremely high torque applications such as tractors, trucks and heavy duty vehicles as shown in FIG. 27. It will be appreciated that it is only a matter of scale to use the same technology as described in FIG. 27A as a unified Advanced Powertrain combining the previously described embodiment of a hydraulically controlled-hydraulic/mechanical differential power control unit with a main power transmission unit and a side mounted differential to provide stepless gearing for all types of vehicles, trucks and tractors as well as differential action.

While the present invention has been described with particular reference to preferred embodiments, the present invention is susceptible of being embodied with various alterations and modifications which may differ particularly from those that have been described in the preceding specification. These variations and alterations are possible without departing from the scope of the invention.

What is claimed is:

1. A power dividing device to provide two rotating outputs having variable relative speed of rotation from a single rotatable input, said device including a first rotational element driven in rotation about a rotational axis and having a first rotational output; a second rotational element rotatable about said rotational axis and having a second rotational output; a first fluid chamber associated with said first rotational element; a first regulator to vary the volume of said first chamber in response to rotation of said first rotational element; a second fluid chamber associated with said second rotational element; a second regulator to vary the volume of said second chamber in response to rotation of said second rotational element; a commutator rotatable in response to rotation of said first rotatable element to at least regularly establish a closed fluid flow communication between said first and second chambers during rotation of said first and second rotational elements; the speed of rotation of said second rotational element in response to rotation of said first rotational element being determined by the respective variations in volume of said fluid in said first and said second chambers.

2. A device as claimed in claim 1 wherein one of said first or second regulators is selectively adjustable to adjust the speed of rotation of said second rotational element.

3. A device as claimed in claim 1 wherein at last one of said first and second regulators include a piston movable in said first or second fluid chambers to vary the volume.

4. A device as claimed in claim 1 further including a third fluid chamber associated with said first rotational element; a third regulator to vary the volume of said third chamber in response to rotation of said first rotational element; a fourth fluid chamber associated with said second rotational element; a fourth regulator to vary the volume of said fourth chamber in response to rotation of said second rotational element; and wherein said commutator selectively establishes closed fluid flow communication between pairs of said first and third chambers and said second and forth chambers.

5. A device as claimed in claim 4 wherein said first and third chambers are substantially diametrically opposed across said rotational axis and said second and fourth chambers are substantially diametrically opposed across said rotational axis.

6. A device as claimed in claim 3 wherein said pistons are movable in a direction generally parallel to said axis of rotation and further including first and second swash plates to operate said pistons.

7. A device as claimed in claim 6 wherein at least one of said swash plates is selectively adjustable to control the variation of the volume of a corresponding one of said first or second chambers.

8. A device as claimed in claim 1 wherein said commutator includes one or more apertures substantially circumferentially surrounding said rotational axis.

9. A device as claimed in claim 8 wherein said apertures are kidney shaped.

10. A device as claimed in claim 1 wherein said first rotational element includes a hollow cylindrical housing as least partially surrounding said second rotational element.

11. A device as claimed in claim 10 wherein said first fluid chamber, said commutator and said second fluid chamber are contained within said housing.

12. A device as claimed in claim 11, wherein said first fluid chamber is fixed against rotation, said commutator rotates with said housing and said fluid chamber rotates with said second rotational element.

13. A device as claimed in claim 1 wherein the respective variations in volume of said first and said second chambers can be adjusted to provide for conjoined rotation of said first and second rotational elements.

14. A device as claimed in claim 1 wherein the respective variations in volume of said first and said second chambers can be adjusted to rotate said second rotational element at one half of the speed of said first rotational element.

15. A device as claimed in claim 1 wherein said fluid chambers are filled with oil.

16. A device as claimed in claim 1, wherein both of said first and said second chambers include a piston movable in said first and second fluid chambers to vary the volume.

17. A device as claimed in any one of claims 1—3, further comprising a variable displacement hydraulic pump driven by rotation of said first rotational element to supply pressurised fluid to said first fluid chamber.

18. A device as claimed in claim 17, wherein said variable displacement hydraulic pump is a bent axis pump.

19. A device as claimed in claim 3, wherein said piston is operated by a cam track surface on said first rotatable element.

20. A power transmission unit including a power dividing device, an outer main transmission and an inner differential gear assembly;

the power dividing device providing two rotating outputs having variable relative speed of rotation, said device including a first rotational element driven in rotation about a rotational axis by a power unit and having a first rotational output; a second rotational element rotatable about said rotational axis and having a second rotational output; a first fluid chamber associated with said first rotational element; a first regulator to vary the pressure of fluid in said first chamber in response to rotation of said first rotational element; a second fluid chamber associated with said second rotational element; a second regulator to vary the pressure of fluid in said second chamber in response to rotation of said second rotational element; a commutator rotatable in response to rotation of said first rotatable element to at least regularly establish a closed fluid flow communication between said first and second chambers during rotation of said first and second rotational elements; the speed of rotation of said second rotational element in response to rotation of said first rotational element being determined by the respective variations in pressure of said fluid in said first and said second chambers;

the main transmission having two rotatable input means each respectively driven by the first rotational output and the second rotatable output of said power dividing device, the two input means being operably connected to rotatable output means so that the rotational speed of the output means can vary in proportion to the algebraic mean of the speeds of rotation of the two input means;

the differential gear assembly being arranged internally of the main transmission and having rotatable input means operably connected to two differentially rotatable output means, wherein the output means of the main transmission and the input means of the differential gear assembly are operably connected.

21. A power transmission unit according to claim 20, wherein said first fluid chamber is fixed against rotation, said commutator rotates with said housing and said second fluid chamber rotates with said second rotational element.

22. A vehicle powertrain capable of being continuously controlled over a predetermined range of operation including:

a single power unit;

a power transmission unit including a power dividing device, an outer main transmission and an inner differential gear assembly;

the power dividing device providing two rotating outputs having variable relative speed of rotation, said device including a first rotational element driven in rotation about a rotational axis by said power unit and having a first rotational output; a second rotational element rotatable about said rotational axis and having a second rotational output; a first fluid chamber associated with said first rotational element; a first regulator to vary the pressure of fluid in said first chamber in response to rotation of said first rotational element; a second fluid chamber associated with said second rotational element; a second regulator to vary the pressure of fluid in said second chamber in response to rotation of said second rotational element; a commutator rotatable in response to rotation of said first rotatable element to at least regularly establish a closed fluid flow communication between said first and second chambers during rotation of said first and second rotational elements; the speed of rotation of said second rotational element in response to rotation of said first rotational element being determined by the respective variations in pressure of said fluid in said first and said second chambers;

the main transmission having two rotatable input means each respectively driven by the first rotational output and the second rotatable output of said power dividing device, the two input means being operably connected to rotatable output means so that the rotational speed of the output means can vary in proportion to the algebraic mean of the speeds of rotation of the two input means;

the differential gear assembly being arranged internally of the main transmission and having rotatable input means operably connected to two differentially rotatable output means, wherein the output means of the main transmission and the input means of the differential gear assembly are operably connected.

23. A vehicle powertrain according to claim 22, wherein said first fluid chamber is fixed against rotation, said commutator rotates with said housing and said second fluid chamber rotates with said second rotational element.

* * * * *